US012802011B2

(12) United States Patent
Aggarwal et al.

(10) Patent No.: US 12,802,011 B2
(45) Date of Patent: Nov. 17, 2026

(54) METHOD AND SYSTEM FOR EVALUATING RISKS ASSOCIATED WITH IMPLEMENTATION OF COMPUTING RESOURCES OPTIMIZATION RECOMMENDATIONS

(71) Applicant: Accenture Global Solutions Limited, Dublin (IE)

(72) Inventors: Sanjana Aggarwal, New Delhi (IN); Abhinav Anand, Bokaro Steel City (IN); Honey Lalit, Pune (IN); Ashwin Dhanapal, Chennai (IN); Sriram Kannan, Bangalore (IN); Mohammad Haseebullah Qureshi, Hyderabad (IN); Paul Bendix Kollannur Sebastian, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 89 days.

(21) Appl. No.: 18/821,782

(22) Filed: Aug. 30, 2024

(65) Prior Publication Data

US 2026/0065201 A1 Mar. 5, 2026

(51) Int. Cl.
*G06Q 10/0635* (2023.01)

(52) U.S. Cl.
CPC ................................ *G06Q 10/0635* (2013.01)

(58) Field of Classification Search
CPC ............. G06Q 10/063; G06Q 10/0635; G06Q 10/0631
See application file for complete search history.

(56) References Cited

U.S. PATENT DOCUMENTS

2014/0164612 A1 6/2014 Hillier
2020/0311561 A1* 10/2020 Naaman ................ G06N 3/063
(Continued)

OTHER PUBLICATIONS

Alonso, et al., "CloudOps: Towards the operationalization of the Cloud Continuum: Concepts, Challenges and a Reference Framework," Applied Sciences, Apr. 2022, vol. 12, 4347, 24 pages.
(Continued)

*Primary Examiner* — William S Brockington, III
(74) *Attorney, Agent, or Firm* — Mannava & Kang, P.C.

(57) ABSTRACT

Methods, systems, and computer-readable storage media for evaluating risks associated with implementation of computing resources optimization recommendations. A parquet file is generated for the computing resources optimization recommendations according to a pre-determined format. The predetermined format includes a set of fields representing information of the computing resources optimization recommendations. The parquet file is processed to obtain values corresponding to a subset of the set of fields for each of the computing resources optimization recommendations and a prompt is generated based on the obtained values. Further, Generative Artificial Intelligence (Gen AI) model is used to generate an optimization implementation risk indicator (OIRI) score and an OIRI assessment of each of the computing resources optimization recommendations based upon the respective prompt. The OIRI score and the OIRI assessment along with each of the computing resources optimization recommendation are displayed in a graphical user interface of a client device of a user.

20 Claims, 17 Drawing Sheets

(56) References Cited

U.S. PATENT DOCUMENTS

| | | | | |
|---|---|---|---|---|
| 2022/0172111 | A1* | 6/2022 | Gao | G06N 20/00 |
| 2022/0291941 | A1* | 9/2022 | Featonby | G06F 9/5077 |
| 2024/0086203 | A1 | 3/2024 | Griffin et al. | |
| 2025/0182181 | A1* | 6/2025 | Unnikrishnan | G06Q 30/0631 |
| 2025/0259036 | A1* | 8/2025 | Pillai | G06N 3/0455 |
| 2025/0363533 | A1* | 11/2025 | DeWeese | G06Q 30/04 |

OTHER PUBLICATIONS

Masip-Bruin, et al., "Managing the Cloud Continuum: Lessons Learnt from a Real Fog-to-Cloud Deployment," Sensors, Apr. 2021, vol. 21, 2974, 18 pages.

Extended European search report, EP App. No. 25195840.1 dated Dec. 12, 2025, 9 pages.

* cited by examiner

1700A

1700C

| Provider | Account | Recom. | Age of Rec. | ID | OIRI | OIRI Ass. | App. | Environment | Business U. | Cost Centre |
|---|---|---|---|---|---|---|---|---|---|---|
| BBB | 1.70752E+11 | AAA | 1 | CCP-10 | 8 | There is a risk | App-1 | Production | Health Ins. | Patient Care |
| BBB | 1.70752E+11 | AAA | 1 | CCP-16 | 3.2 | The res | | | | |
| BBB | 1.70752E+11 | AAA | 1 | CCP-1 | 4.5 | There is moderate risk ass. | App-1 | | Health Ins. | Patient Care |

There is a moderate risk associated with downsizing the compute resource type in a production environment with high business criticality. However, the potential impact of cost saving is high. It is recommended to carefully evaluate the potential impact on performance before implementing the downsizing recommendations.

FIG. 17C

METHOD AND SYSTEM FOR EVALUATING RISKS ASSOCIATED WITH IMPLEMENTATION OF COMPUTING RESOURCES OPTIMIZATION RECOMMENDATIONS

TECHNICAL FIELD

Various embodiments described herein relate generally to computer-implemented method, computer system, and computer-readable media for evaluating risks associated with implementations of computing resources optimization recommendations.

BACKGROUND

Cloud computing provides on-demand delivery of computing resources for different clients/tenants to store, manage, and process data. In the dynamic landscape of cloud computing, optimization of the computing resources is paramount for maximizing utilization and reducing costs. Therefore, different cloud service providers may provide different recommendations for optimizing the computing resources. However, assessing, selecting, and implementing one or more such recommendations for optimizing the computing resources pose several challenges.

SUMMARY

Implementations of the present disclosure provide dynamic and robust risk assessment mechanisms for assessing computing resources optimization recommendations, arriving at a risk score and risk assessment for each of the computing resources optimization recommendations, approving, and implementing the computing resources optimization recommendations.

In at least one example, the present disclosure provides a computer-implemented method for evaluating risks associated with implementation of a plurality of computing resources optimization recommendations. The method includes receiving the plurality of computing resources optimization recommendations that are generated during a predefined time duration. The method includes generating a parquet file according to a predetermined format. The predetermined format includes a set of fields representing information of the plurality of computing resources optimization recommendations. The method includes processing the parquet file to obtain values corresponding to a subset of the set of fields for a computing resources optimization recommendation of the plurality of computing resources optimization recommendations. The method includes providing the values corresponding to the subset of the set of fields for the computing resources optimization recommendation as an input context to generate a prompt. The method includes generating, using a Generative Artificial Intelligence (Gen AI) model, an optimization implementation risk indicator (OIRI) score and an OIRI assessment of the computing resources optimization recommendation based upon the prompt. The method includes causing display of the OIRI score and the OIRI assessment along with the computing resources optimization recommendation in a graphical user interface of a client device of a user.

The present disclosure further provides a system for implementing the method provided herein. The present disclosure also provides a non-transitory computer-readable storage media (CRM) coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

Various embodiments in accordance with the present disclosure will be described with reference to the drawings, in which:

FIG. 17C depicts an example OIRI assessment, in accordance with implementations of the present disclosure.

Like reference numbers and designations in the various drawings indicate like elements.

DETAILED DESCRIPTION

Figure 1:
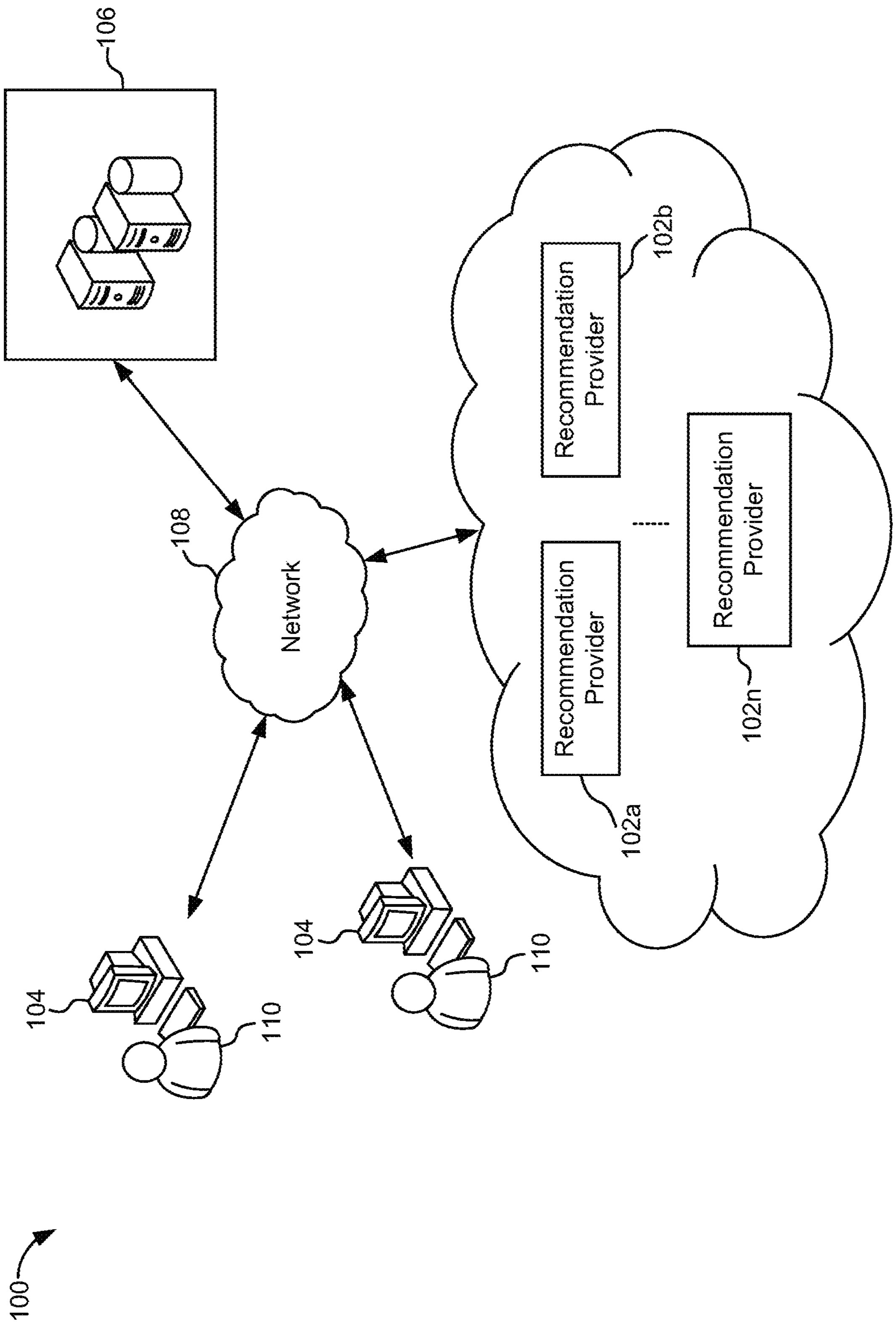
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example," "an example of" by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to;" it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the disclosure as set forth in the claims.

A Cloud Service Provider (CSP) provides computing resources to different client devices to power their data related operations. Examples of the computing resources may include networks, servers, data storage, applications, services, and/or the like. The CSP may provide the computing resources to a client device based on an agreement between the CSP and a user of the client device. The agreement may specify an average cost that the user is to pay for the computing resources. Alternatively, or additionally, the agreement may specify a threshold associated with use of the computing resources (e.g., a specified amount of the computing resource that the user is permitted to use, a specified rate at which the user is permitted to use the computing resource, etc.). Therefore, optimizing utilization of the computing resources may be crucial for realizing an actual utilization of the computing resources on a cloud, which may further reduce cost and energy consumption.

The CSP may also provide recommendations for optimizing utilization of the computing resources (hereinafter referenced as computing resources optimization recommendations). Alternatively, or additionally, internal applications may receive the computing resources optimization recommendations and customize the computing resources optimization recommendations for the user. The computing resources optimization recommendations may be received based on utilization of the computing resources by the user. The computing resources optimization recommendations may save the cost spent on the computing resources. For example, annual potential savings of approximately 20% may be achieved by implementing the computing resources optimization recommendations.

In the currently known approaches, the user is required to manually assess all the computing resources optimization recommendations and approve one or more of the computing resources optimization recommendations for implementation. However, it may be difficult for the user to assess and approve the computing resources optimization recommendations, when they are received in a huge volume (e.g., thousands of computing resources optimization recommendations per week). Further, the user may struggle to determine an impact of implementing the computing resources optimization recommendations, as the user may not obtain a view into an impact/risk of implementing such recommendations. Therefore, the user may be reluctant to provide an approval for implementing the computing resources optimization recommendations, or the user may incorrectly or inappropriately provide an approval for implementing the computing resources optimization recommendations.

Further, assessing of the computing resources optimization recommendations may require specific domain knowledge, since factors such as environment of the computing resources, type of the computing resources, and/or the like, introduce complexities. Therefore, assessment of the computing resources optimization recommendations may increasingly be dependent on availability of subject matter experts and may get delayed due to their availability. Therefore, the currently known approaches may involve a large amount of labor costs and time costs for assessment and approval of the computing resources optimization recommendations, which may be inefficient.

In addition, inappropriate/inefficient approval of one or more of the computing resources optimization recommendations may cause scarcity for some of the computing resources or may result in underutilization of some of the computing resources. Due to which, the user may additionally spend on the computing resources. For example, if the user approves the computing resources optimization recommendations that include the computing resources that are not necessary, then the computing resources are not being utilized and such recommendations may be expensive. Conversely, if the user approves the computing resources optimization recommendations that do not include the necessary computing resources, then such recommendations may be unacceptable or may hinder enterprise operations. Therefore, assessment and approval of the computing resources optimization recommendations may be fraught with various risks.

Implementations of the present disclosure provide a dynamic and robust risk assessment mechanism, which generates comprehensive risk indicator scores and risk assessments. The risk indicator scores and the risk assessments may be tailored for evaluating the risks associated with implementation of the computing resources optimization recommendations. The risk indicator scores may encompass various dimensions of the risks including, but not limited to, an environment, current spends, criticality of the computing resources, and/or the like. With the risk indicator score, the user may take an informed and calculated decision for implementing the computing resources optimization recommendation with reduced cost.

FIG. 1 depicts an example environment 100 that may be used to execute implementations of the present disclosure. In some examples, the example environment 100 enables assessment, approval, and implementation of recommendations received for optimizing utilization of computing resources.

As depicted in FIG. 1, the example environment 100 includes recommendation providers 102*a*-102*n*, client devices 104, and a risk evaluation system 106. The recommendation providers 102*a*-102*n*, the client devices 104, and the risk evaluation system 106 may be communicatively coupled with each other using a network 108. In some examples, the network 108 may include, but is not limited to, a Local Area Network (LAN), a Wide Area Network (WAN), the Internet, or a combination thereof. In some examples, the network 108 may be accessed over a wired and/or a wireless communication link.

The recommendation providers 102*a*-102*n* may be cloud nodes maintained by same or different Cloud Service Providers (CSPs)/cloud vendors. The recommendation providers 102*a*-102*n* may provide computing resources to an entity associated with the client devices 104 for performing one or more operations. In some examples, the operations may include data storage operations, data processing operations, and/or the like. The computing resources may include static or dynamic computing resources. The computing resources may be provided in a form of Infrastructure as a service (IaaS), Platform as a service (PaaS), and Software as a service (SaaS).

In some examples, the computing resources (also referenced herein as cloud resources, cloud computing resources, or the like)) may include network resources, data storage, servers, applications, and services. Example of the network resources may include routers, bandwidth, network management software, and/or the like. Examples of the data storage may include storage resources, memory, Random Access Memory (RAM), databases, and/or the like. Examples of the servers may include processors, hardware servers, Virtual Machines (VMs), hypervisor, containers, and/or the like. Examples of the applications and services may include email applications, data collection/processing applications, accounting applications, Human Resource (HR) related applications, medical related applications, and/or the like.

The recommendation providers 102*a*-102*n* may also provide recommendations for optimizing utilization of the computing resources. Hereinafter, the recommendations are referenced as computing resources optimization recommendations. In some examples, the computing resources optimization recommendations may be related for optimizing usage of the computing resources and associated performance. In some examples, the computing resources optimization recommendations may be related for cost optimization. Further, the computing resources optimization recommendations may be provided based on subscriptions selected by the entity.

The client devices 104 may be associated with the entity (also referenced herein as tenant, client, or the like) and used by users 110 of the entity. In some examples, each of the entities may include an organization, a corporation, a business unit of a corporation, a department of a corporation, a banking unit, a medical/healthcare unit, and/or the like. In some examples, each of the users 110 may include an administrator, a subject matter expert (SME), and/or the like. Examples of the client devices 104 may include a desktop, smartphones, laptops, a tablet, voice-enabled devices, and/or the like. It is contemplated that the implementations of the present disclosure may be realized with any appropriate type of computing device.

The client devices 104 may be used by the respective users 110 to log into and interact with a computing platform executing risk management applications. In some examples, the client devices 104 may display one or more Graphical User Interfaces (GUIs) that enable the respective users 110 to interact with the computing platform executing the risk management applications. Interacting with the computing platform may include initiating a request for the risk evaluation system 106 through the risk management application and receiving a response for the request from the risk evaluation system 106. The request may be for evaluating risks associated with implementation of the computing resources optimization recommendations. The response may include results of evaluation of the risks associated with implementation of the computing resources optimization recommendations.

In some examples, the risk evaluation system 106 may be implemented as an on-premises system. In some other examples, the risk evaluation system 106 may be implemented as an off-premises system (for example, a cloud or an on-demand system). Additionally, or alternatively, the risk evaluation system 106 may be implemented in a cloud environment. For simplicity, the risk evaluation system 106 depicted in FIG. 1 may be a cloud environment that is intended to represent various forms of servers including a web server, an application server, a proxy server, a network server, a server pool, and/or the like.

The risk evaluation system 106 may receive the computing resources optimization recommendations and evaluate the risks associated with implementations of the computing resources optimization recommendations. In accordance with implementations of the present disclosure, the risk evaluation system 106 may generate an Optimization Implementation Risk Indicator (OIRI) score and an OIRI assessment of each of the computing resources optimization recommendations. The risk evaluation system 106 may provide the OIRI score and the OIRI assessment of each of the computing resources optimization recommendations to the users of the client devices 104. Based on the OIRI score and the OIRI assessment of each of the computing resources optimization recommendations, the users 110 of the client devices 104 may select, approve, and implement one or more of the computing resources optimizations recommendations for the one or more operations of the entity.

Various examples of evaluating the risks associated with implementation of the computing resources optimization recommendations are described in detail in conjunction with FIGS. 2-17D.

Figure 2:
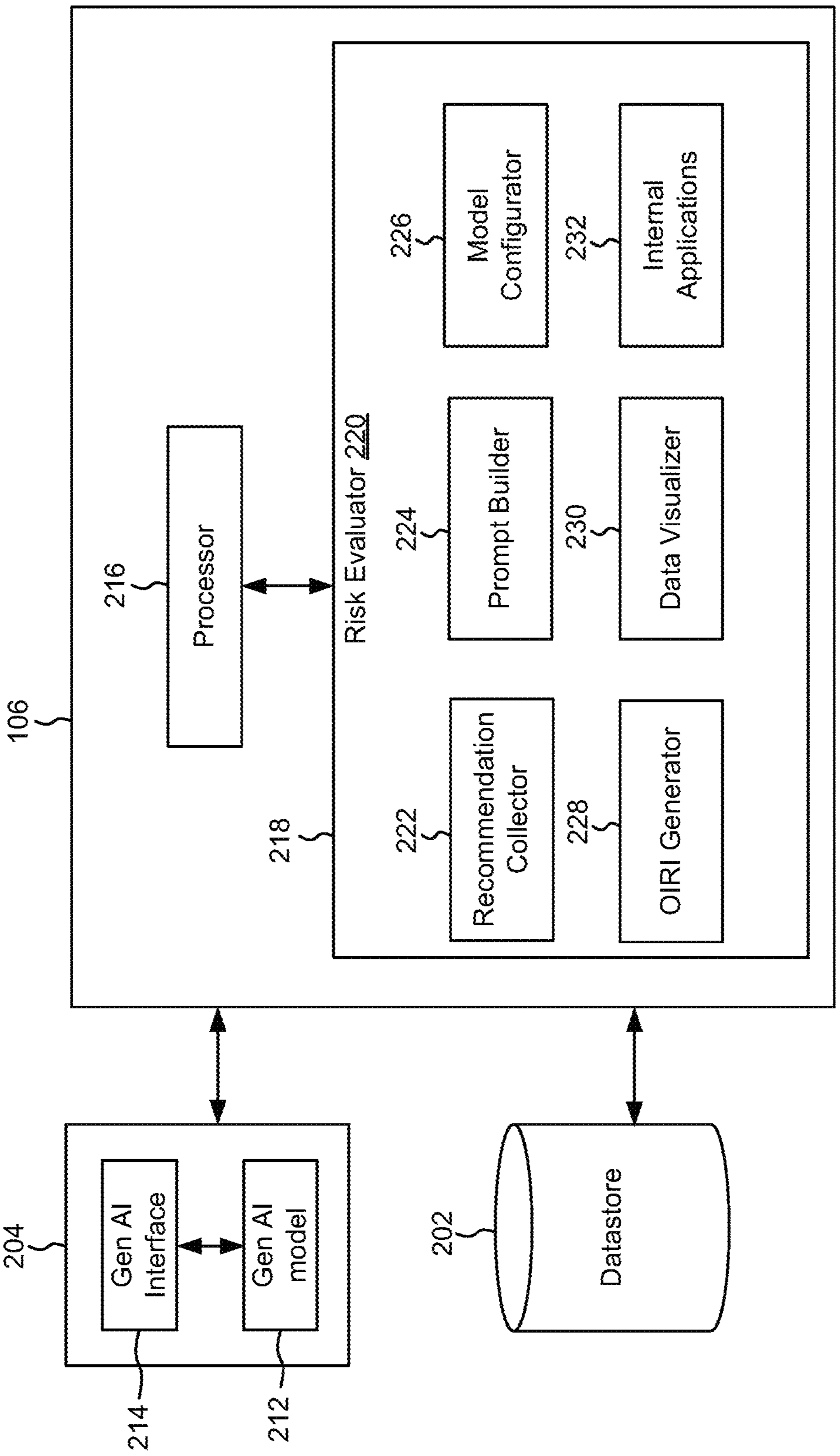
FIG. 2 depicts an example architecture of a risk evaluation system for evaluating risks associated with implementation of computing resources optimization recommendations, in accordance with implementations of the present disclosure.

FIG. 2 depicts an example architecture of the risk evaluation system 106 for evaluating the risks associated with implementation of the computing resources optimization recommendations, in accordance with implementations of the present disclosure. As depicted in FIG. 2, the risk evaluation system 106 may be communicatively coupled to a datastore 202 and a Generative Artificial Intelligence (Gen AI) system 204.

The datastore 202 may act as a repository for storing the computing resources optimization recommendations. The computing resources optimization recommendations may be generated by the different recommendation providers 102*a*-102*n* (depicted in FIG. 1) over a predetermined time duration (e.g., week, month, and/or the like).

The Gen AI system 204 may be used for evaluating the risks associated with implementation of the computing resources optimization recommendations. The Gen AI system 204 may include a Gen AI model(s) 212 and a Gen AI interface 214.

The Gen AI model 212 may be hosted on a hosting infrastructure like a cloud computing platform, or the like. In some examples, the Gen AI model 212 may be hosted in different types of paradigms, which include, without limitation, model-as-a service (MaaS) models, specialized MaaS (SMaaS) models, self-deployed models, and/or the like. The Gen AI model 212 may include a foundation model/Large Language Model (LLM). The Gen AI interface 214 may be used to interact with the Gen AI model 212. Alternatively, or additionally, as would be understood that the Gen AI model 212 may have an inbuilt Gen AI interface 214. Example of the Gen AI interface 214 may include an Application Programming Interface (API).

While implementations of the present disclosure are described in further detail herein with non-limiting reference to the Gen AI model 212, it is contemplated that implementations of the present disclosure may be realized using any Machine Learning (ML) models, or Artificial Intelligence (AI) models, or any other similar models.

The risk evaluation system 106 includes a processor 216 and a memory 218. The processor 216 may include one or more processors. Examples of the processor 216 may include but not limited to, microprocessors, microcomputers, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. The processor 216 may be communicatively coupled with the memory 218. Further, the processor 216 may be configured to execute instructions (also referenced herein as computer-readable instructions) for performing operations according to the present disclosure. The memory 218 may be non-transitory or non-volatile medium, such as a magnetic disk or solid-state non-volatile memory or volatile medium such as Random Access Memory (RAM), and/or the like.

Further, as depicted in FIG. 2, the risk evaluation system 106 includes risk evaluator 220. The risk evaluator 220 may be stored in the memory 218 and provided as a downloadable library including the instructions. The risk evaluator 220 includes a recommendation collector 222, a prompt builder 224, a model configurator 226, a OIRI generator 228, and a data visualizer 230. In some examples, the processor 216 may execute the recommendation collector 222, the prompt builder 224, the model configurator 226, the OIRI generator 228, and the data visualizer 230, for evaluating the risks associated with implementation of the computing resources optimization recommendations. In some other examples, the processor 216 may include dedicated processors (e.g., five processors) to execute the recommendation collector 222, the prompt builder 224, the model configurator 226, the OIRI generator 228, and the data visualizer 230, for evaluating the risks associated with implementation of the computing resources optimization recommendations.

The recommendation collector 222 may receive the computing resources optimization recommendations. The computing resources optimization recommendations may indicate measures for optimizing utilization of the computing resources. For example, a computing resources optimization recommendation may indicate one or more of: a recommendation for combining utilizations of the multiple computing resources into a single computing resource, deduplicating utilizations of the computing resources (e.g., deduplicating requests for same data), identifying utilizations of the computing resources that may be paused for a certain time period, and/or the like.

The recommendation collector 222 may receive the computing resources optimization recommendations continuously, or based on predefined time intervals (e.g., weekly, monthly, or the like), or based on a scheduled time period. In some examples, the recommendation collector 222 may receive the computing resources optimization recommendations from the recommendation providers 102*a*-102*n* or the datastore 202. In some other examples, the recommendation collector 222 may receive the computing resources optimization recommendations from internal applications 232. The computing resources optimization recommendations received from the internal applications 232 may include computing resources optimization recommendations customized for the client device(s) 104. The internal applications 232 may provide the computing resources optimization recommendations based on usage of the computing resources by the entity(ies) associated with the client device (s) 104. The computing resources optimization recommendations may be stored in the datastore 202. An example illustration of receiving the computing resources optimization recommendations is described in detail in conjunction with FIGS. 4 and 7.

The recommendation collector 222 may generate a parquet file for the computing resources optimization recommendations. In some examples, the recommendation collector 222 may generate a parquet file of the parquet files for the computing resources optimization recommendations based on a predetermined format stored in the datastore 202. The predetermined format may include a set of fields representing information of the computing resources optimization recommendations. Therefore, the parquet file may be generated by normalizing information included in the computing resources optimization recommendations.

In some examples, the information represented by the set of fields may include a registered account, a request identifier (ID), an ID of a computing resource, an optimization level, an application, an entity unit, a cost center, a provider, a resource type, a recommendation type, a recommendation description, a recommended action, a criticality of an optimization recommendation, an environment associated with the optimization recommendation, a potential monthly and/or annual savings value, a current monthly cost, and/or the like. The parquet file may be stored in the datastore 202.

The prompt builder 224 may generate prompts for the Gen AI model 212 based on the parquet file corresponding to the computing resources optimization recommendations. The prompt builder 224 may process the parquet file to obtain values corresponding to a subset of the set of fields for each of the computing resources optimization recommendations. As would be understood, the subset of the set of fields may be paramount for evaluating the risks associated with implementation of the computing resources optimization recommendations. The subset of the set of fields may correspond with non-confidential and/or non-sensitive information. In some examples, the subset of the set of fields may include a provider, resource types, a recommendation type, a recommendation description, a recommended action, a criticality of an optimization recommendation, a potential monthly and/or annual savings value, and/or a current monthly cost.

Upon processing the parquet file, the prompt builder 224 may use the obtained values from processing of the parquet file as an input context for generating the prompts. The prompts may be generated for evaluation of the risks associated with implementations of the computing resources optimization recommendations. In some examples, the prompt builder 224 may also include one or more hyperparameters of the Gen AI model 212 in the prompts. The one or more hyperparameters of the Gen AI model 212 may refer to hyperparameters of the Gen AI model 212 required to be tuned/controlled while executing the Gen AI model 212. Examples of the one or more hyperparameters may include a seed parameter, a temperature parameter, and/or the like. Therefore, each of the prompts may include the values of the subset of the set of fields of the respective computing resources optimization recommendation and the one or more hyperparameters. The prompt builder 224 and an associated process flow are described in detail in conjunction with FIGS. 10 and 11, respectively.

By way of a non-limiting example, the model configurator 226 may operate in parallel with the recommendation collector 222 and the prompt builder 224. The model configurator 226 may enable the risk evaluation system 106 to access/download the Gen AI model 212 through the Gen AI interface 214 and initiate a deployment process. The deployment process may include deploying the Gen AI model 212 to a respective endpoint/production environment (e.g., execution environment). The model configurator 226 and an associated process flow are described in detail in conjunction with FIGS. 8 and 9, respectively.

Once the prompt is generated and the deployment of the Gen AI model 212 is successful, the OIRI generator 228 may evaluate the risks of implementing the computing resources optimization recommendations and generate the OIRI scores and the OIRI assessments for the computing resources optimization recommendations. The OIRI score of the OIRI scores may be a value indicating a level of risk associated with implementation of the respective computing resources optimization recommendation. In some examples, the value of the OIRI score may be 1 or 10 or greater than 1 and less than 10. Therefore, the OIRI score may vary from 1 to 10 (including 1 and 10). The OIRI score with low value may indicate a low risk associated with implementation of the respective computing resources optimization recommendation. Conversely, the OIRI score with high value may indicate a high risk associated with implementation of the respective computing resources optimization recommendation. The OIRI assessment of the OIRI assessments may indicate what would be the risk or impact associated with implementation of the respective computing resources optimization recommendation.

The OIRI generator 228 may use the Gen AI model 212 to generate the OIRI scores and the OIRI assessments. To illustrate, the OIRI generator 228 may input the prompts to the Gen AI model 212, which may be trained to process the prompts and generate the OIRI scores and the OIRI assessments for the computing resources optimization recommendations. In some examples, generating the OIRI score using the Gen AI model 212 may include generating the OIRI score based on a score value respective to each field of the subset of the set of fields and a weight corresponding to each field of the subset of the set of fields. The OIRI scores and the OIRI assessments may be generated by encompassing various dimensions of the risks such as, but not limited to, an environment, a cost, and a criticality of each of the computing resources.

The OIRI generator 228 may form a mapping of the computing resources optimization recommendations with the respective OIRI scores and the OIRI assessments and stores the mapping in the datastore 202 in a form of recommendation file. The OIRI generator 228 and associated process flow are described in detail in conjunction with FIGS. 12 and 13.

The data visualizer 230 may access the recommendation file from the datastore 202 and cause display of the OIRI scores and the OIRI assessments along with the respective computing resources optimization recommendations in a graphical user interface of the client device 104 of the user 110. Based on the OIRI scores and the OIRI assessments, the user 110 may obtain a detail view or insights of the risks associated with implementation of the computing resources optimization recommendations. Accordingly, the user may efficiently approve and implement one or more of the computing resources optimization recommendations associated with the low risk. Alternatively, or additionally, the OIRI generator 228 may automatically approve one or more of the computing resources optimization recommendations associated with the low risk for implementation or having an OIRI score that is not greater than a user specified value.

Figure 3:
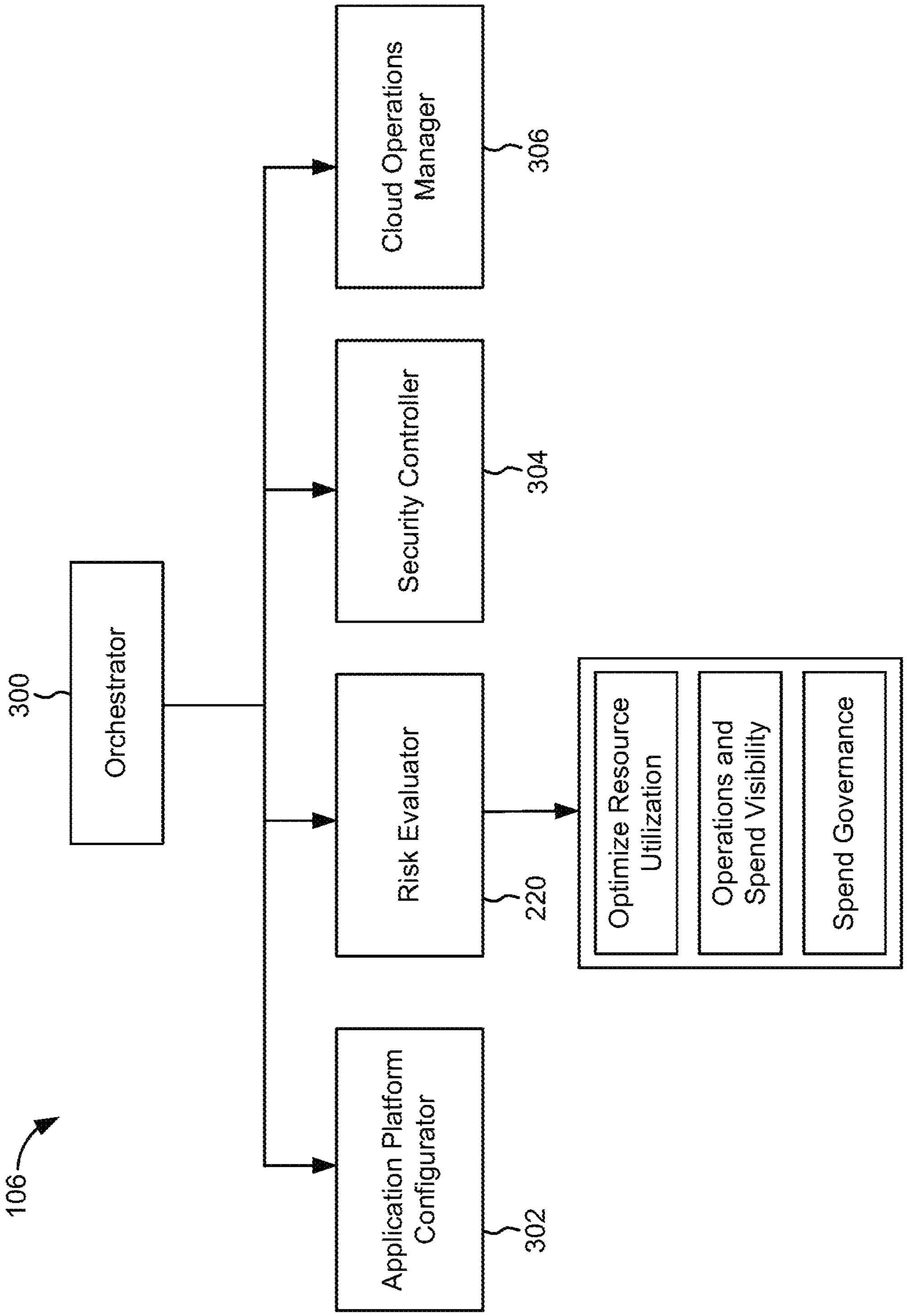
FIG. 3 depicts an example orchestrator of the risk evaluation system, in accordance with implementations of the present disclosure.

FIG. 3 depicts an example orchestrator 300 of the risk evaluation system 106, in accordance with implementations of the present disclosure. The orchestrator 300 integrates the risk evaluator 220 with other components of the risk evaluation system 106 such as an application platform configurator 302, a security controller 304, and a cloud operations manager 306. The risk evaluator 220 in conjunction with the application platform configurator 302, the security controller 304, and the cloud operations manager 306 may form a continuum control plane to manage, enable, and optimize utilization of the computing resources, which may further assist the entity in managing and enabling hybrid/multi cloud operations. The application platform configurator 302 may configure utilization of the computing resources for various operations of applications being managed by the entity. The security controller 304 may secure the applications and the associated operations. The cloud operations manager 306 may handle allocation and enabling of the computing resources for managing the operations of the applications.

The risk evaluator 220 may act as a vendor agnostic platform addressing an end-to-end cloud spend management, which may involve tracking expenditure (cost/budget) spent on the computing resources and controlling the expenditure by optimizing utilization of the computing resources.

The risk evaluator 220 may receive the computing resources optimization recommendations and generate the OIRI scores and the OIRI assessments associated with the computing resources optimization recommendations. The OIRI scores and the OIRI assessments may provide a detailed view into an impact/risk of implementing the respective computing resources optimization recommendations. Therefore, the risk evaluator 220 may allow the user to approve one or more of the computing resources optimized recommendation for implementation. Such an implementation may optimize utilizations of the computing resources. The optimized utilizations of the computing resources may save spending of the cost on the computing resources that are underutilized or zombie or orphan. Further, the risk evaluator 220 may allow the user to track and govern the cost spent on the utilizations of the computing resources.

Further, with the OIRI scores and the OIRI assessments, the user may assess the risk of implementing the computing resources optimization recommendations, regardless of which or how many recommendation providers 102*a*-102*n* (depicted in FIG. 1) the user is accessing. In some examples, along with the OIRI assessments, the risk evaluator 220 may provide details such who is using with which computing resources, how the computing resources are being used and why the computing resources are being used. Therefore, the user may gain visibility that aid in effectively managing a total cost spend, as well as deploying standard policies and spend controls across the computing resources.

Figure 4:
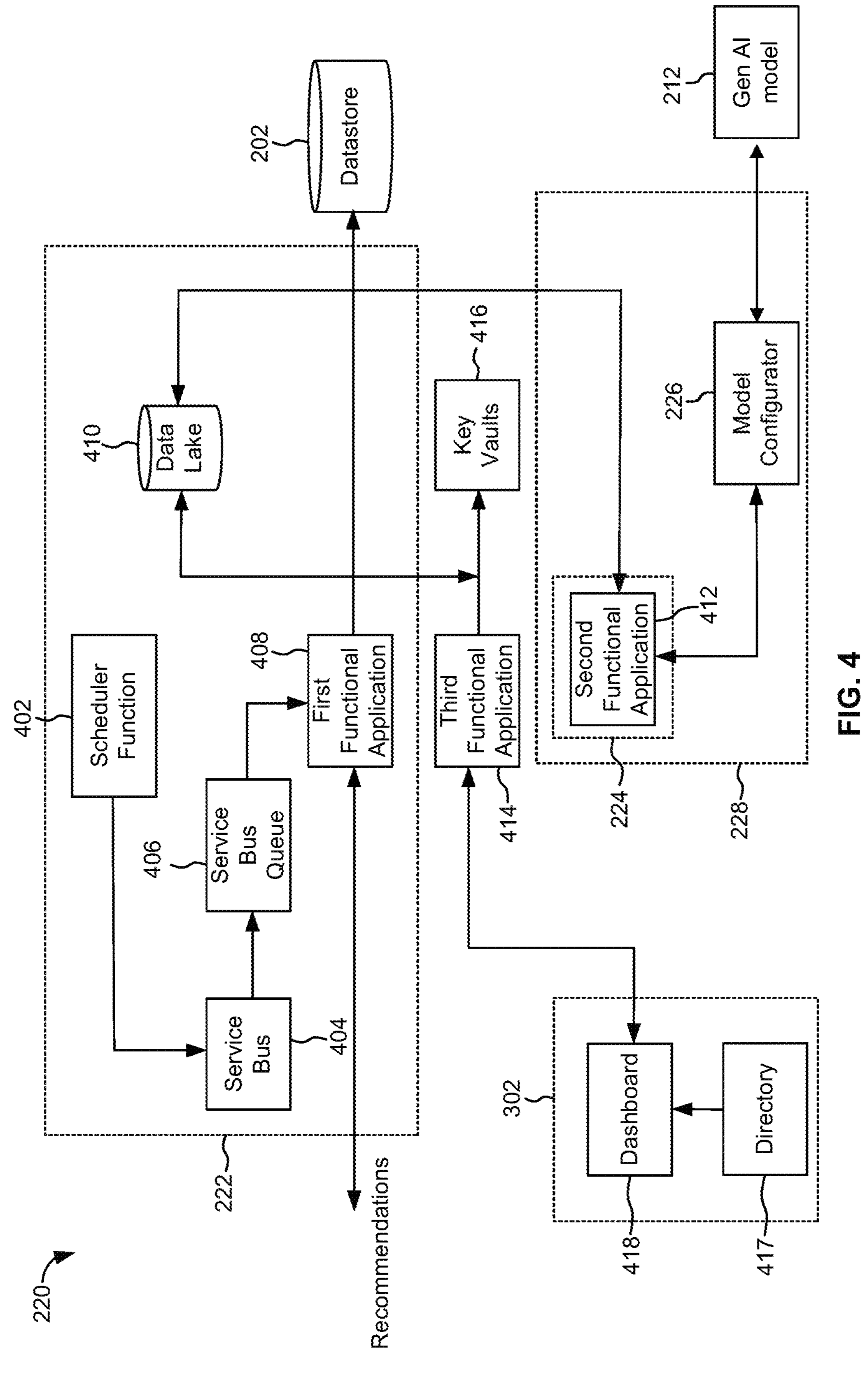
FIG. 4 depicts an example conceptual architecture of a risk evaluator in the risk evaluation system for evaluating risks associated with implementations of the computing resources optimization recommendations, in accordance with implementations of the present disclosure.

FIG. 4 depicts an example conceptual architecture of the risk evaluator 220 for evaluating risks associated with implementations of the computing resources optimization recommendations, in accordance with implementations of the present disclosure.

The recommendation collector 222 includes a scheduler function 402, a service bus 404, a service bus queue 406, a first functional application/recommendation ingestor 408, and a data lake 410. The scheduler function 402 may initiate a process of receiving the computing resources optimization recommendations. The scheduler function 402 may send a message to the service bus queue 406 through the service bus 404. The message may be for receiving the computing resources optimization recommendations. Based on the received message, the service bus queue 406 may invoke the first functional application 408. When the invoked first functional application 408 reads the message of the scheduler function 402, the first functional application 408 may communicate with the recommendation providers 102*a*-102*n* (depicted in FIG. 1) through an Application Programming Interface (API) gateway (not shown in FIG. 4) and receive the computing resources optimization recommendations generated over time by one or more recommendation providers 102*a*-102*n*.

Once the computing resources optimization recommendations are received, the first functional application 408 may convert such recommendations into a specific schema and create the parquet file. The first functional application 408 may convert the computing resources optimization recommendations into the specific schema using the predetermined format. The first functional application 408 may push the parquet file into the data lake 410 and stored in a container (not depicted in FIG. 4). The first functional application 408 may also push the parquet file into the datastore 202 (depicted in FIG. 2).

The prompt builder 224 may include a second functional application 412. The second functional application 412 may retrieve the parquet file from the data lake 410/datastore 202 and may generate the prompts corresponding to the computing resources optimization recommendations. Each of the prompts may from a contextualized and structured query having directives for the Gen AI model 212 along with an indication of the hyperparameters for tuning.

The second functional application 412 may invoke the Gen AI model 212, which has been deployed to the endpoint by the model configurator 226.

The invoked Gen AI model 212 may be used by the OIRI generator 228 to process the prompts and generate the OIRI scores and the OIRI assessments for the respective computing resources optimization recommendations. During processing of the prompts, the OIRI generator 228 may control operations of the Gen AI model 212 by tuning the hyperparameters of the Gen AI model 212, which have been specified in the prompts. Thereby, the OIRI scores and the OIRI assessments may be efficiently generated. The OIRI generator 228 may map the OIRI scores and the OIRI assessments of the columns with the respective rows/computing resources optimization recommendations and add the mapping to the recommendation file. The OIRI generator 228 may further publish the recommendation file to the data lake 410 through the second functional application 412.

Further, the risk evaluator 220 may include a third functional application 414, which may securely store the recommendation file using Key Vaults 416.

The data visualizer 230 may fetch the recommendation file through the third functional application 414 and display the OIRI scores and OIRI assessments of the computing resources optimization recommendations on a dashboard 418 coupled to a directory 417. By way of a non-limiting example, the dashboard 418 may be displayed on one or more client devices 104. The OIRI scores and the OIRI assessments may be displayed through suitable widgets. In some examples, the OIRI scores and OIRI assessments may be generated monthly for new computing resources optimization recommendations.

Figure 5:
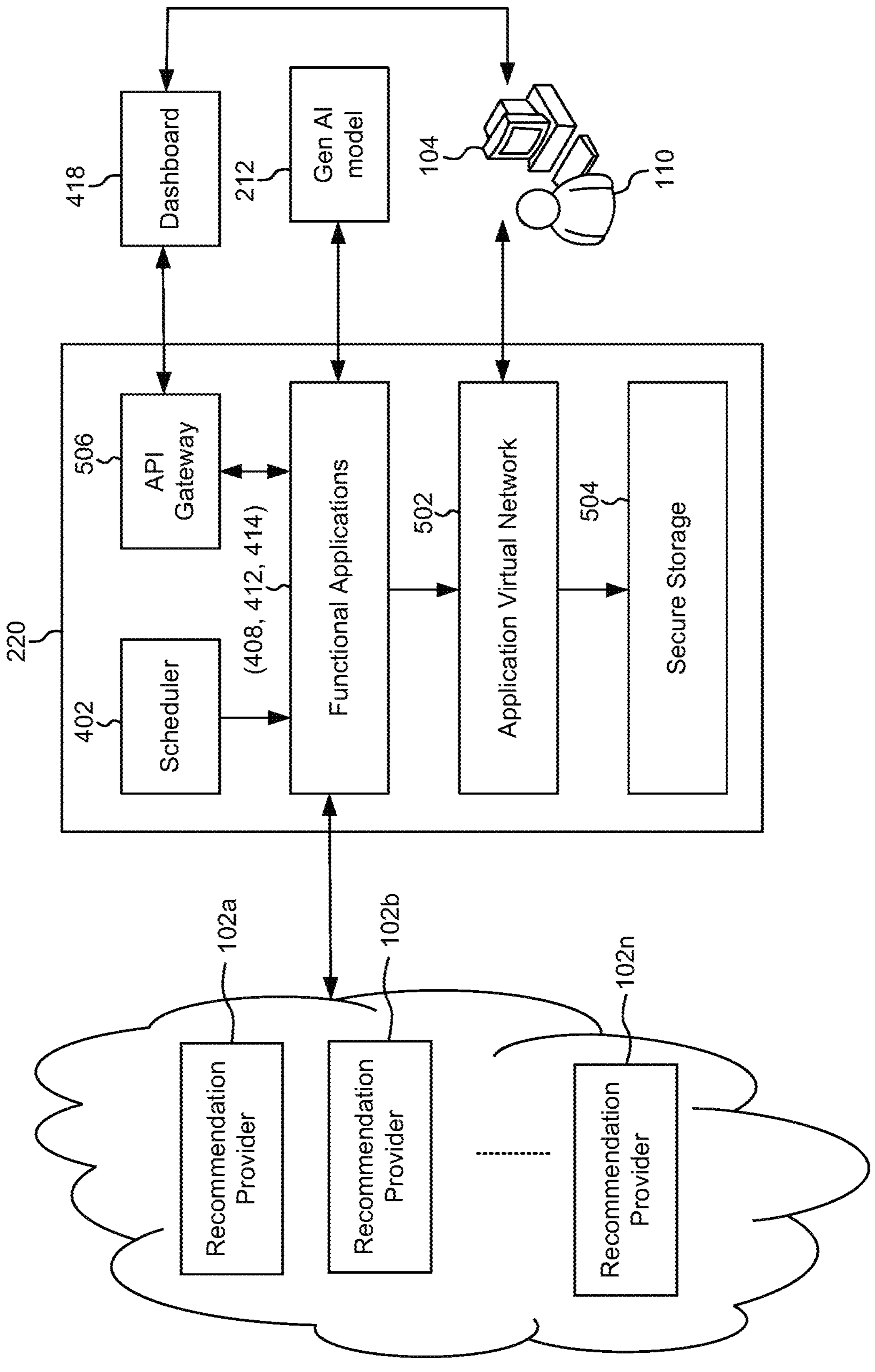
FIG. 5 depicts an example functional flow of evaluating the risks with implementations of the computing resources optimization recommendations using the risk evaluator, in accordance with implementations of the present disclosure.

FIG. 5 depicts an example functional flow 500 of evaluating the risks with implementations of the computing resources optimization recommendations using the risk evaluator 220, in accordance with implementations of the present disclosure.

As depicted in FIG. 5, the scheduler function 402 may invoke the first functional application 408, which may collect the computing resources optimizations recommendations from the recommendation providers 102*a*-102*n*. Upon the collection, the first functional application 408 may normalize the computing resources optimization recommendations and accordingly generate the prompts. The prompts may be processed using the Gen AI model 212 to generate the OIRI scores and the OIRI assessments for the computing resources optimization recommendations, which may be further stored in an application virtual network 502. The application virtual network 502 may include, for example, a Key Vault (KV) endpoint, a storage endpoint, and a cosmos endpoint for storing and managing of the OIRI scores and the OIRI assessments for the computing resources optimization recommendations. Further, the OIRI scores and the OIRI assessments of the computing resources optimization recommendations stored in the application virtual network 502 may be secured through a secure storage 504 including for example, a key vault, a storage account, and a secure database (e.g., cosmos database).

Further, the user 110 of the client device 104 may access the dashboard 418 for accessing the OIRI scores and the OIRI assessments of the one or more computing resources optimization recommendations. The third functional application 414 may update the dashboard 418 with the OIRI scores and the OIRI assessments of the one or more computing resources optimization recommendations via an API gateway 506.

Figure 6:
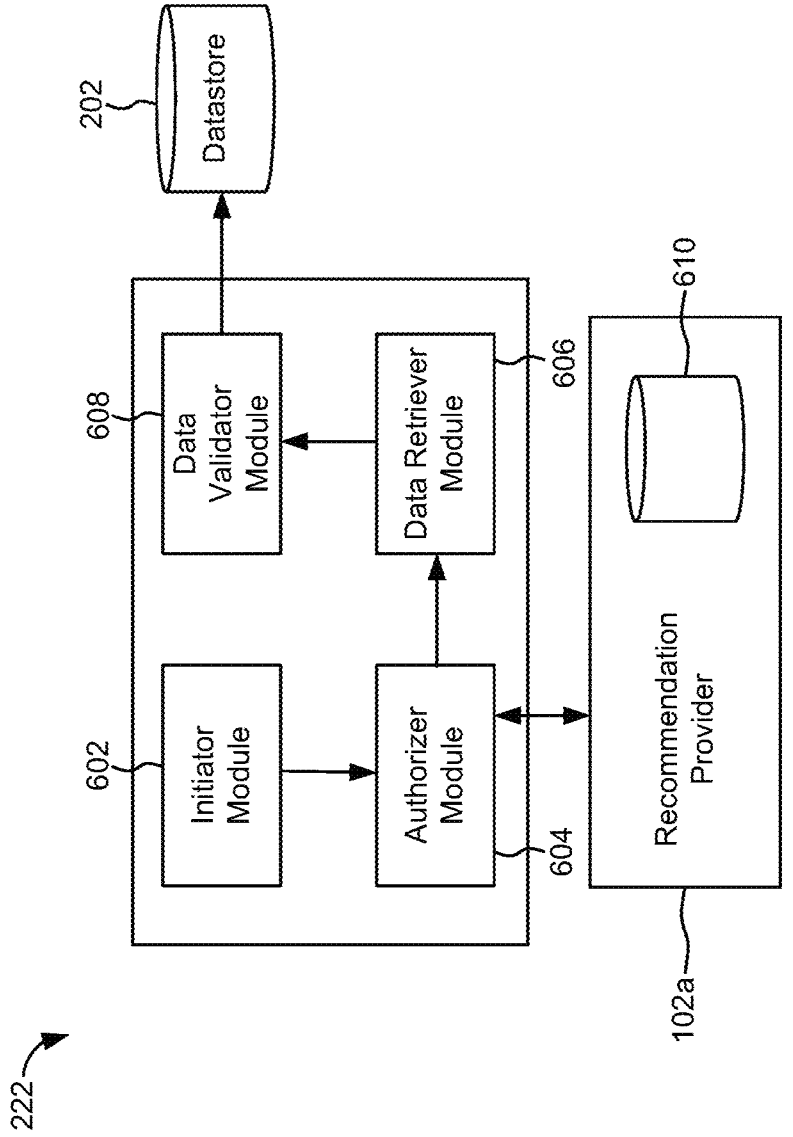
FIG. 6 depicts an example block diagram of a recommendation collector for receiving the computing resources optimization recommendations, in accordance with implementations of the present disclosure.

FIG. 6 depicts an example block diagram of the recommendation collector 222 for receiving the computing resources optimization recommendations, in accordance with implementations of the present disclosure. As depicted in FIG. 6, the recommendation collector 222 includes an initiator module 602, an authorizer module 604, a data retriever module 606, and a data validator module 608 for receiving the computing resources optimization recommendations from one of the recommendation providers 102*a*-102*n*, for example, a recommendation provider 102*a*. The recommendation provider 102*a* may store the computing resources optimization recommendations in its cloud database 610. An example process flow 700 of receiving the computing resources optimization recommendations from the recommendation provider 102*a* using the components 602-608 of the recommendation collector 222 is depicted in FIG. 7.

Figure 7:
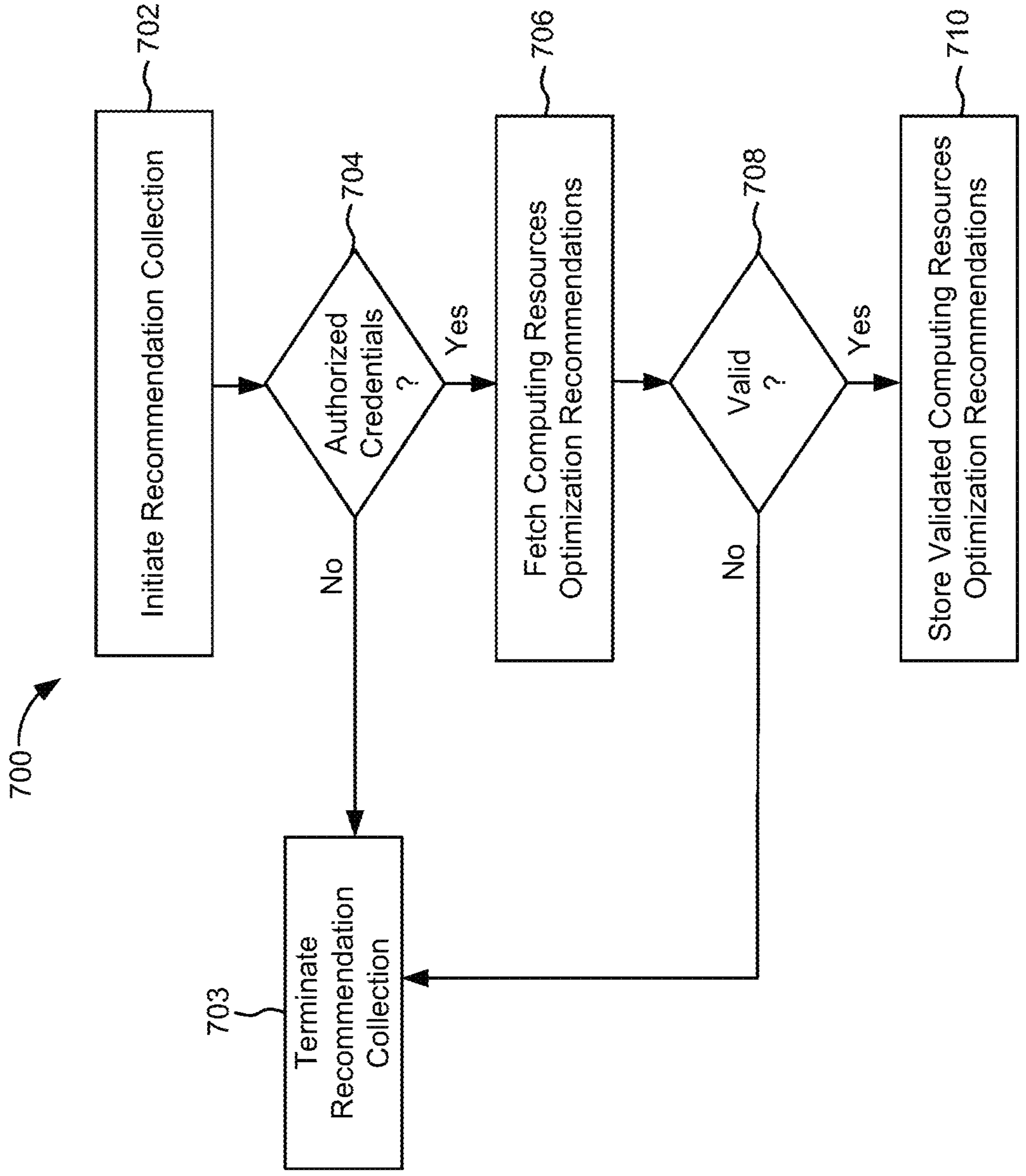
FIG. 7 depicts an example process flow of receiving the computing resources optimization recommendations, in accordance with implementations of the present disclosure.

As depicted in FIG. 7, the initiator module 602 initiates 702 a recommendation collection job for receiving the computing resources optimization recommendations. Upon initiating the recommendation collection job, the authorizer module 604 performs 704 an authorization to check if client credentials associated with the client device 104 are authorized to access the recommendation provider 102*a* associated with the client device 104. The client credentials may be created on performing a registration by the entity of the client device 104 with the recommendation provider 102*a* for the computing resources optimization recommendations. If the client credentials are not authorized, the initiator module 602 terminates 703 the recommendation collection.

If the client credentials are authorized, the data retriever module 606 receives/fetches 706 the computing resources optimization recommendations from the cloud database 610 (depicted in FIG. 6) of the recommendation provider 102*a*. The computing resources optimization recommendations may be fetched based on subscriptions selected by the entity during the registration performed with the recommendation provider 102*a*. The subscriptions may include weekly/monthly based subscriptions, subscriptions for a predetermined number of computing resources optimization recommendations, subscriptions for computing resources optimization recommendations related to cost, security, and performance, and/or the like.

Upon receiving the computing resources optimization recommendations, the data validator module 608 performs 708 a validation to check if the received computing resources optimization recommendations are valid or not. The validation may be performed to ensure integrity and consistency of the received computing resources optimization recommendations. If the received computing resources optimization recommendations are not valid, the data validator 608 terminates 703 the recommendation collection. If the received computing resources optimization recommendations are valid, the data validator module 608 stores 710 the received computing resources optimization recommendations in the datastore 202. The data validator 608 may store the received computing resources optimization recommendations in a form of the parquet file. The parquet file may include normalized computing resources optimization recommendations. In some embodiments, the received computing resources optimization recommendations may be stored in the datastore 202 without performing 708 validations as described herein.

Figure 8:
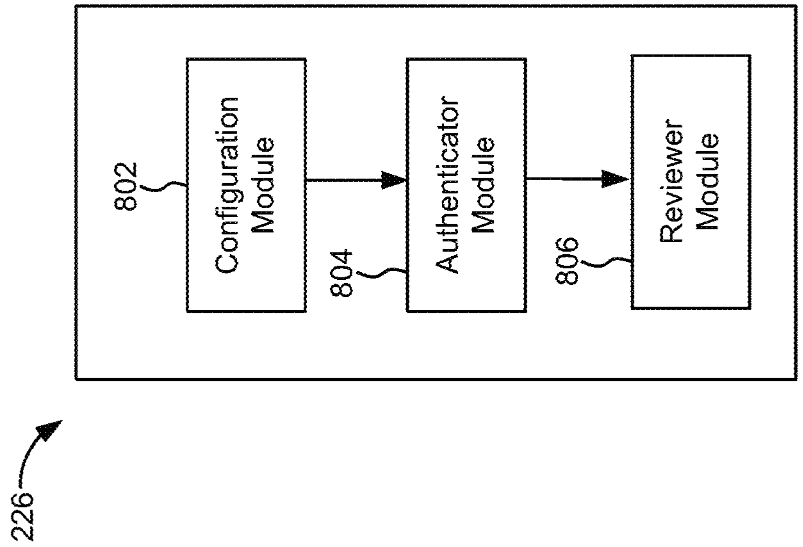
FIG. 8 depicts an example block diagram of model configurator for configuring deployment of a Generative Artificial Intelligence (Gen AI) model, in accordance with implementations of the present disclosure.

FIG. 8 depicts an example block diagram of model configurator 226 for configuring deployment of the Gen AI model 212, in accordance with implementations of the present disclosure. As depicted in FIG. 8, the model configurator 226 includes a configuration module 802, an authenticator module 804 and a reviewer module 806. An example process flow 900 of configuring the deployment of the Gen AI model 212 using the components 802-806 of the model configurator 226 is depicted in FIG. 9.

Figure 9:
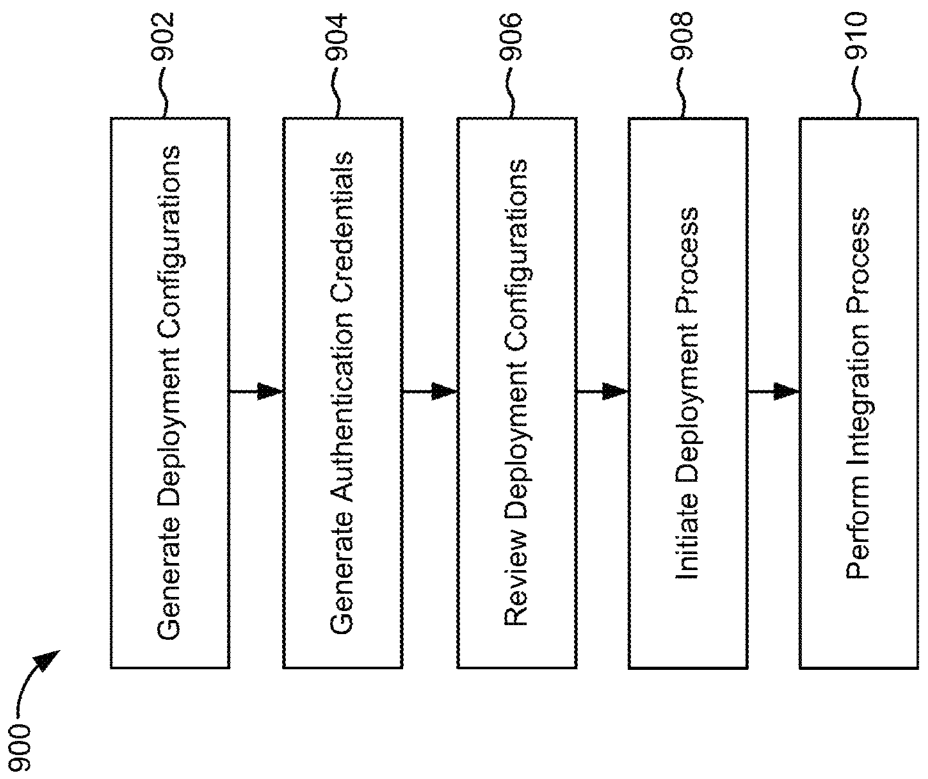
FIG. 9 depicts an example process flow of configuring deployment of the Gen AI model, in accordance with implementations of the present disclosure.

As depicted in FIG. 9, the configuration module 802 generates 902 deployment configurations for deployment of the Gen AI model 212 to an endpoint/production environment. The endpoint may refer to an environment in which the Gen AI model 212 may be executed. The endpoint may provide resources for execution of the Gen AI model 212. The configuration module 802 may download the Gen AI model 212 by accessing through the Gen AI interface 214 of the Gen AI system 204 and generate the deployment configurations by customizing the Gen AI model (e.g., in terms of training, re-training, and fine-tuning, or the like). Upon generating the configurations, the authenticator module 804 generates authentication credentials for accessing the Gen AI model. The authentication credentials may be generated via secure authentication mechanisms.

Once the authentication mechanisms are established, the reviewer module 806 reviews 906 the deployment configurations. Once the review is successful, the reviewer module 806 initiates 908 a deployment process to deploy the Gen AI model 212 to the endpoint using the deployment configurations. After the deployment, the reviewer module 806 performs an integration process 910 to integrate the risk management application with the deployed Gen AI model 212. The risk management application may be integrated with the Gen AI model 212 using the endpoint and authentication credentials generated during establishment of the authentication mechanisms.

Figure 10:
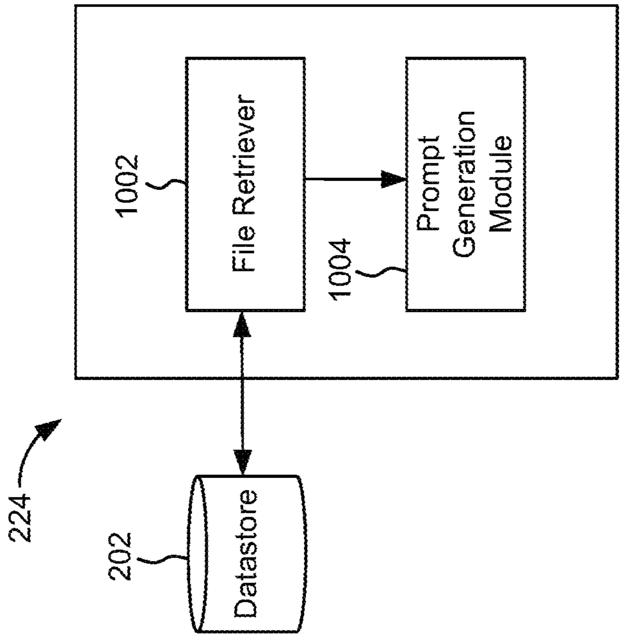
FIG. 10 depicts an example block diagram of a prompt builder for generating prompts, in accordance with implementations of the present disclosure.

FIG. 10 depicts an example block diagram of the prompt builder 224 for generating the prompts, in accordance with implementations of the present disclosure. As depicted in FIG. 10, the prompt builder 224 includes a file retriever 1002, and a prompt generation module 1004. An example process flow 1100 of generating the prompts using the file retriever 1002 and the prompt generation module 1004 is depicted in FIG. 11.

Figure 11:
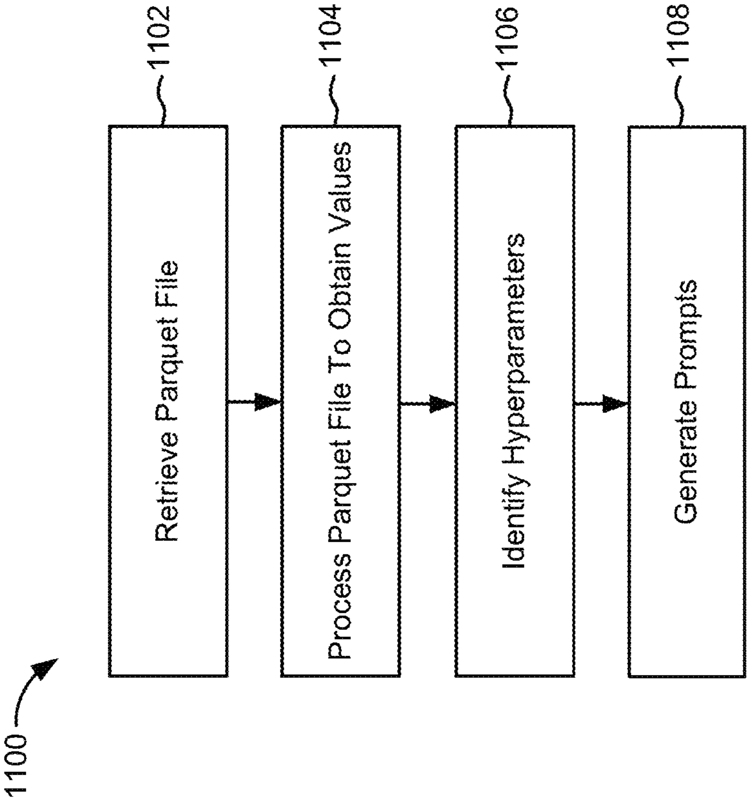
FIG. 11 depicts an example process flow of generating the prompts, in accordance with implementations of the present disclosure.

As depicted in FIG. 11, the file retriever 1002 retrieves 1102 the parquet file stored in the datastore 202 for the computing resources optimization recommendations. The parquet file may include rows and multiple columns for each of the rows. Each different row of the rows may represent a different computing resources optimization recommendation. The multiple columns of each of the rows may represent the set of fields associated with the respective row/computing resources optimization recommendation.

The prompt generation module 1004 processes 1104 the parquet file to obtain the values of the subset of the set of fields for each of the computing resources optimization recommendations. The values may be obtained by reading certain columns from the parquet file. The columns from which the values have been obtained may be of interest for evaluating the risks associated with implementation of the computing resources optimization recommendations.

The prompt generation module 1004 also identifies 1106 the hyperparameters of the Gen AI model 212 for tuning. The identified hyperparameters of the Gen AI model 212 may be controlled/tuned during execution of the Gen AI model 212, which may ensure that outputs of the Gen AI model 212 are dependable and consistently replicated. The outputs of the Gen AI model 212 may include the OIRI scores and the OIRI assessments. Further, with controlling/tuning of the hyperparameters, the outputs of the Gen AI model 212 may be replicated with minimal variation, thereby deterministic outputs may be derived from the Gen AI model 212.

In some examples, the hyperparameters of the Gen AI model 212 may include a seed parameter and a temperature parameter. The seed parameter may enable prompting of the Gen AI model 212 to attempt deterministic sampling with repeated prompts/requests under the same seed and other hyperparameters expected to return the similar outputs. With the implication of the seed parameter, consistency and predictability of the outputs of the Gen AI model 212 may be improved. Further, the seed may aid in generation of the efficient outputs when the prompts may include the computing resources optimization recommendations with respect to testing, debugging, application development and may require uniform outputs. In addition, with the implication of the seed parameter, a behavior of the Gen AI model 212 may be controlled for obtaining the outputs that are stable. The stable outputs may be required where the outputs need to be reproducible for validation or compliance purposes. The temperature parameter may vary between 0 and 2. By way of a non-limiting example, a default value for the temperature parameter may be selected as 1 or 0.7 depending on a type of the Gen AI model 212. The temperature parameter may be identified to control randomness in the outputs of the Gen AI model 212. For example, the temperature parameter with high values may result in more randomness in the outputs of the Gen AI model 212 and the temperature with low values may result in the outputs that are deterministic. Therefore, setting the temperature parameter around 0 may aid in deriving the efficient outputs from the Gen AI model 212.

The prompt generation module 1004 generates 1108 the prompts, based on the values of the subset of the set of fields, and the identified hyperparameters of the Gen AI model 212 for tuning. Therefore, each of the prompts forms a query and context for the Gen AI model 212. An example prompt may include "<What would be a risk associated with implementation of recommendation including <environment: production> <criticality: untagged> <resource type: storage resources> <annual savings: $1200> and <hyperparameters: seed, temperature: 0.7>". As would be understood, implementations of the present disclosure may not be limited to the example prompt described herein and it is contemplated that the implementations of the present disclosure may be realized with any appropriate type of prompts.

In some examples, the prompt generation module 1004 may define a role for the risk evaluation system 106, the user, and an assistant for utilizing the prompts in generating the OIRI scores and the OIRI assessments using the Gen AI model 212.

Figure 12:
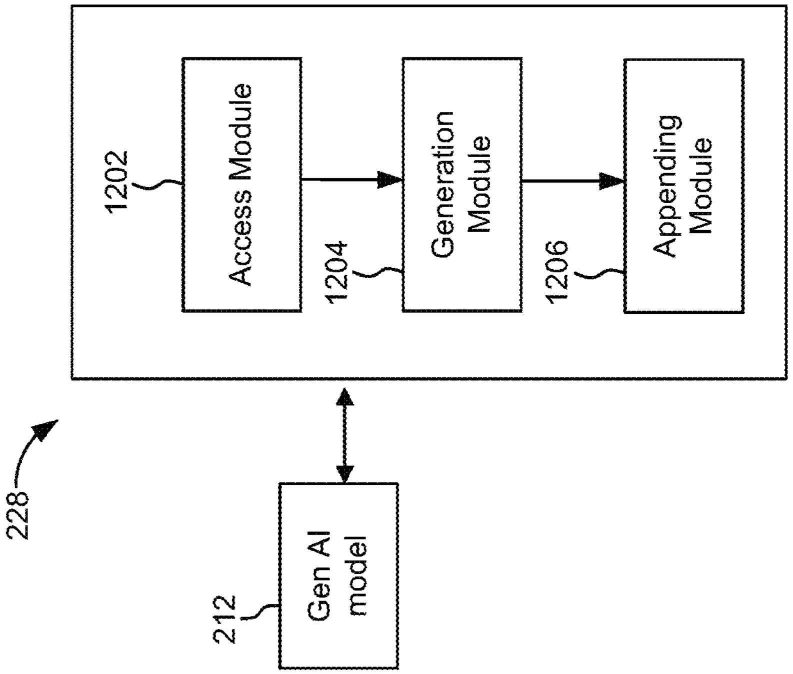
FIG. 12 depicts an example block diagram of an optimization implementation risk indicator (OIRI) generator for generating OIRI scores and OIRI assessments, in accordance with implementations of the present disclosure.

FIG. 12 depicts an example block diagram of the OIRI generator 228 for generating the OIRI scores and the OIRI assessments, in accordance with implementations of the present disclosure. As depicted in FIG. 12, the OIRI generator 228 includes an access module 1202, a generation module 1204, and an appending module 1206. An example process flow 1300 of generating the OIRI scores and the OIRI assessments using the modules 1202-1206 of the OIRI generator 228, is described in FIG. 13.

Figure 13:
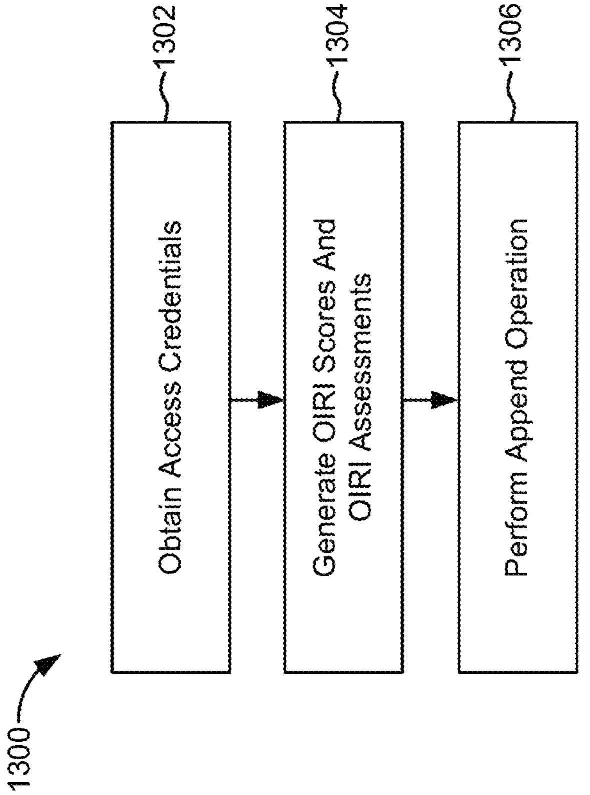
FIG. 13 depicts an example process flow of generating the OIRI scores and the OIRI assessments, in accordance with implementations of the present disclosure.

As depicted in FIG. 13, the access module 1202 obtains 1302 access credentials from the datastore 202 for accessing the Gen AI model 212. The access credentials referred herein may include API credentials for accessing the Gen AI model 212.

The generation module 1204 generates 1304 the OIRI scores and the OIRI assessments by performing calculations and analysis on the prompts. The generation module 1204 may accesses the Gen AI model 212 based on the obtained access credentials and use the Gen AI model 212 to perform the calculations and analysis on the prompts for generation of the OIRI scores and the OIRI assessments. The OIRI scores and the OIRI assessments may indicate level and impact of the risks associated with implementations of the respective computing resources optimization recommendations, respectively.

The OIRI score may be calculated based on the score value of each field of the subset of the set of fields and the weight corresponding to each field. For example, the OIRI score may be calculated as:

$$OIRI \text{ Score} = resosurce \text{ type score} * 0.1 + \text{region score} * 0.1 + \text{recommended } optimizaton \text{ action} * 0.1 +$$

-continued $$\text{cloud service provider score} * 0.1 + \text{environment score} * 0.3 + \textit{criciticality} \text{ score} * 0.3$$

wherein, the resource type score, the recommend optimization score, the cloud service provider score, the environment score, and the criticality score may indicate scores of fields of the subset of fields such as the resource type, the recommendation action, the provider, the environment associated with the computing resources optimization recommendation, and the criticality of the optimization recommendation, and/or the like. Thereby, utilizations of all the computing resources may be considered for generation of the OIRI score. Further, accuracy in the OIRI score may be optimized based on the prompt and based on number and quality of fields of the subset of the set of fields that have been considered for generation of the OIRI score.

The OIRI score may vary from 1 to 10. In some examples, the computing resources optimization recommendation with the OIRI score that is below 5 or another user specified value may be considered as having a low-risk and may be automatically approved for implementation.

The OIRI assessment may detail a type of risk associated with implementation of the respective computing resources optimization recommendation. For example, consider that the computing resources optimization recommendation includes a recommendation for downsizing a computing resource. In such a scenario, an example OIRI assessment generated for the recommendation may indicate "There is a risk associated with downsizing the computing resource type in a production environment with high criticality. However, the potential impact of cost savings is high. It is recommended to carefully evaluate the potential impact on performance before implementing the downsizing recommendation." Exemplary OIRI scores and OIRI assessments associated with respective computing resources optimization recommendations are described in conjunction with FIGS. 17A-17D.

The appending module 1206 performs 1306 an append operation to form a mapping of the OIRI scores and the OIRI assessments with the respective computing resources optimization recommendations. Further, the appending module 1206 stores the mapping in the datastore 202 in a form of the recommendation file.

Figure 14:
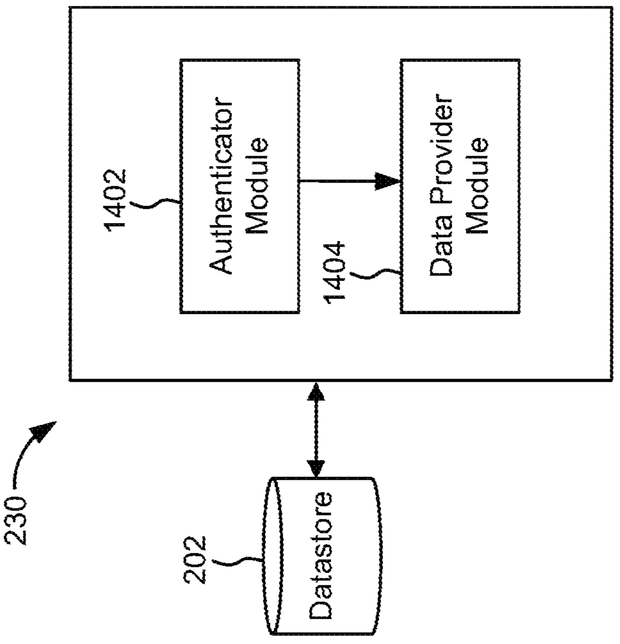
FIG. 14 depicts an example block diagram of a data visualizer for providing visual representations of the OIRI scores and the OIRI assessments, in accordance with implementations of the present disclosure.

FIG. 14 depicts an example block diagram of the data visualizer 230 for providing visual representations of the OIRI scores and the OIRI assessments associated with the respective computing resources optimization recommendations, in accordance with implementations of the present disclosure. The data visualizer 230 includes an authenticator module 1402, and a data provider module 1404. An example process flow 1500 of providing the visual representations of the OIRI scores and the OIRI assessments associated with the respective computing resources optimization recommendations is depicted in FIG. 15.

Figure 15:
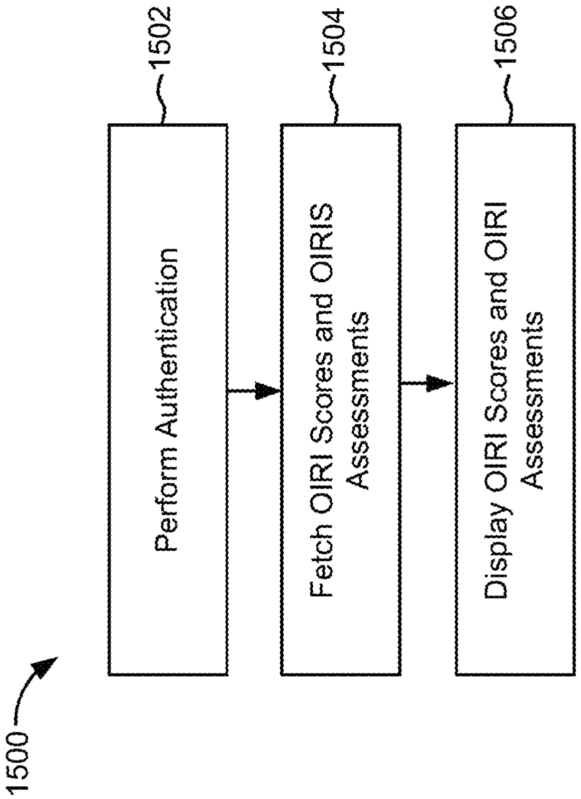
FIG. 15 depicts an example process flow of providing the visual representations of the OIRI scores and the OIRI assessments, in accordance with implementations of the present disclosure.

As depicted in FIG. 15, the authenticator module 1404 perform 1502 an authentication to authenticate the user of the client device 104 for accessing the OIRI scores and the OIRI assessments. The risk evaluation system 106 may provide the risk management application through which the user of the client device 104 may initiate a request for the OIRI scores and the OIRI assessments for the computing resources optimization recommendations. Upon receiving the request, the authenticator module 1404 authenticates the user of the client device 104.

Once the authentication is successful, the data provider module 1404 fetches 1504 the OIRI scores and the OIRI assessments for the requested computing resources optimization recommendations from the datastore 202. The data provider module 1404 may fetch the OIRI scores and the OIRI assessments in real-time or near real-time to ensure that the fetched OIRI scores and the OIRI assessments reflect the latest information.

The data provider module 1404 displays 1506 the OIRI scores the OIRI assessments for the requested computing resources optimization recommendations on the dashboard, through which the user may access the computing resources optimization recommendations.

For example, consider a scenario where an entity A with annual spend of approximately $150 Million is undergoing a multi-year, large-scale migration to a public cloud as the entity A plans to cut costs and boost efficiency in the face of low energy prices and prepare for growing volumes of data from a sensor-laden equipment. For such a large-scale migration, the entity A receives, for example, 100 computing resources optimization recommendations from the different recommendation providers for optimizing the computing resources on the public cloud. The computing resources optimization recommendations may correspond to security, cost and performance parameters. In such a scenario, the user of the entity A requests the risk evaluation system 106 through the respective client device 104 to evaluate risks associated with the 100 computing resources optimization recommendations. The risk evaluation system 106 reads the subset of the set of fields of the 100 computing resources optimization recommendations line by line and generates the prompts. The risk evaluation system 106 generates the OIRI scores and the OIRI assessments for the 100 computing resources optimization recommendations by processing the prompts using the Gen AI model 212. The risk evaluation system 106 may display the OIRI scores and the OIRI assessments along with the respective 100 computing resources optimization recommendations on the graphical user interface (GUI) of the client device 104. Based on the OIRI scores and the OIRI assessments, the user of the client device 104 approves and implements, for example, 10 efficient computing resources optimization recommendations among the 100 recommendations for the large-scale migration. Therefore, utilization of the computing resources may be optimized with reduced risk and cost.

Figure 16:
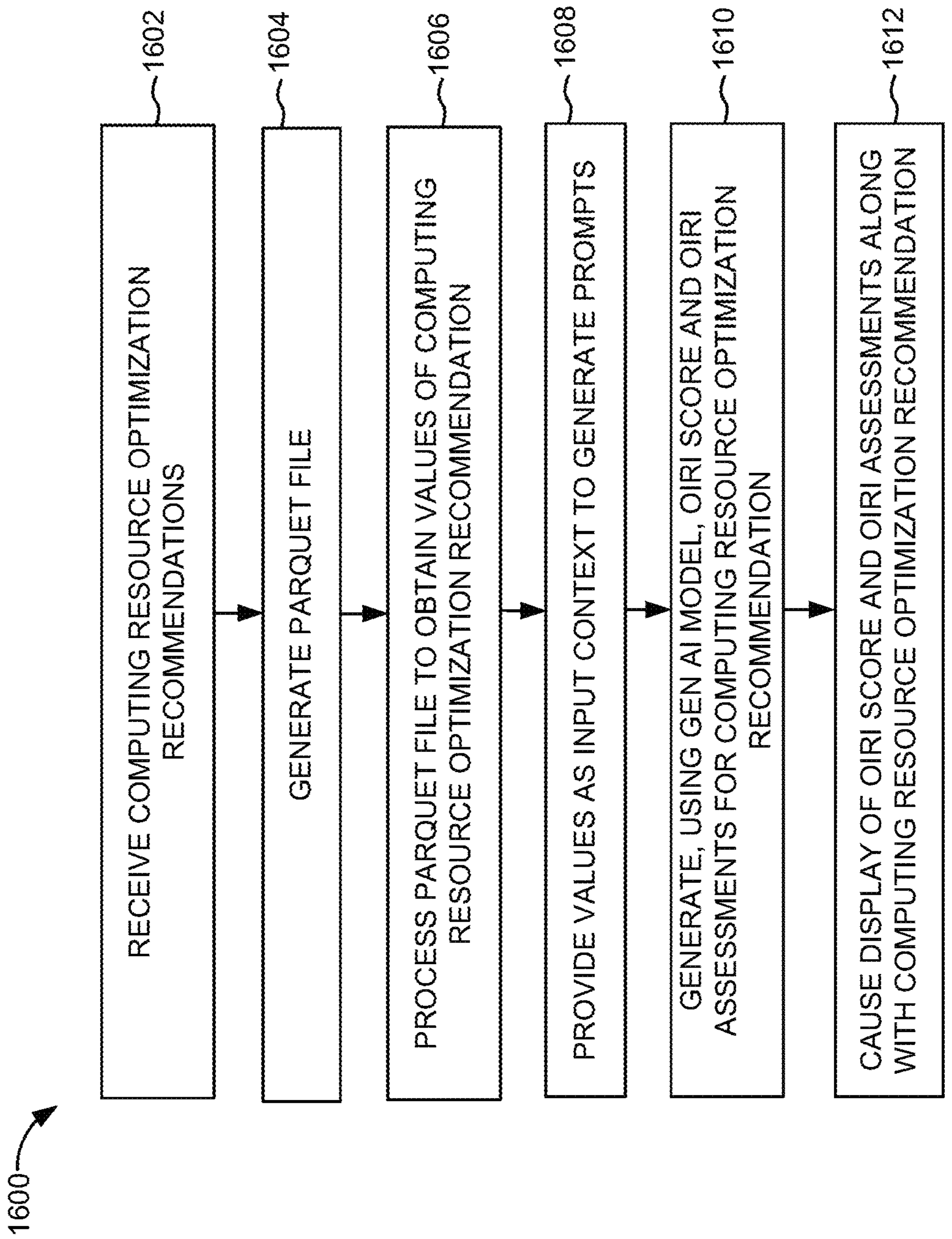
FIG. 16 is a flow diagram that presents an example computer-implemented method for evaluating risks associated with implementations of the computing resources optimization recommendations, in accordance with implementations of the present disclosure.

FIG. 16 is a flow diagram that presents an example computer-implemented method 1600 for evaluating risks associated with implementations of the computing resources optimization recommendations, in accordance with implementations of the present disclosure. In some implementations, the method may be executed within the risk evaluation system 106 and by one or more processors 216 (depicted in FIG. 2) using modules of the memory 218 (depicted in FIG. 2).

The method includes receiving 1602 the computing resources optimization recommendations. The computing resources optimization recommendations may include recommendations for optimizing utilization of the computing resources for performing the one or more operations. The computing resources optimization recommendations may be generated during a predefined time duration.

The method includes generating 1604 the parquet file. The parquet file may correspond to the computing resources optimization recommendations. The paraquet file may be generated based on the predetermined format. The predetermined format may include the set of fields representing information of the computing resources optimization recommendations. The information represented by the set of fields for the computing resources optimization recommendation may include a registered account, a request ID, an ID of a computing resources, an optimization level, an application, an entity unit, a cost center, a provider, a resource type, a recommendation type, a recommendation description, a recommended action, a criticality of an optimization recommendation, an environment associated with the optimization recommendation, a potential monthly and/or annual savings value, a current monthly cost, and/or the like.

Once the parquet file generated, the method includes processing 1606 the parquet file to obtain values corresponding to the subset of the set of fields for the computing resources optimization recommendation of the computing resources optimization recommendations. The subset of the set of fields may be of important fields, which may contribute to or have an impact on the risk associated with implementation of the computing resources optimization recommendations. Examples of the subset of the set of fields may include a provider, a resource type, a recommendation type, a recommendation description, a recommended action, a criticality of an optimization recommendation, an environment associated with the optimization recommendation, a potential monthly and/or annual savings value, and/or a current monthly cost. Further, the subset of the set of fields may correspond with non-confidential and/or non-sensitive information.

The method further includes providing 1608 the values corresponding to the subset of the set of fields for the computing resources optimization recommendation as an input context to generate the prompt. In some implementations, the method further includes adding the hyperparameters in the prompt for the Gen AI model 212 (depicted in FIG. 2). The hyperparameters added in the prompt may be the hyperparameters of the Gen AI model 212 to be tuned/controlled during an execution of the Gen AI model 212. In some examples, the hyperparameters may include a seed parameter, a temperature parameter, and/or the like.

After generating the prompt, the method includes generating 1610, using the Gen AI model 212, the OIRI score and the OIRI assessment of the computing resources optimization recommendation based upon the prompt. The Gen AI model 212 may be executed on the processor to generate the OIRI score and the OIRI assessment by performing analysis and calculation on the values of the subset of the set of fields in the prompt. For example, the OIRI score may be generated based on the score value respective to each field of the subset of the set of fields and the weight corresponding to each field of the subset of the set of fields. Generation of the OIRI score and the OIRI assessment is described in detail in conjunction with FIGS. 2 and 13, therefore repeated description is omitted herein.

The method further includes causing 1612 display of the OIRI score and the OIRI assessment along with the computing resources optimization recommendation in the GUI of the client device 104 of the user 110 (depicted in FIG. 1).

Implementations of the present disclosure provide technical solutions to multiple technical problems that arise in the context of evaluation of the risks associated with implementation of the computing resources optimization recommendations. Implementations of the present disclosure enable generation of the OIRI scores and the OIRI assessments, which provide a holistic view of the risks involved in implementing the respective computing resources optimization recommendations. Thereby, risk evaluation may be automated, which may eliminate labor costs and reduce time of the risk evaluation.

Implementations of the present disclosure further use the Gen AI model for generating the OIRI scores and the OIRI assessments. Therefore, the risk evaluation may be performed with high accuracy. Further, a sophisticated risk scoring computation and well-constructed prompts may be used for the Gen AI model that considers multiple factors including the sensitivity of data, the criticality of applications, the complexity of infrastructure, environment of the resources. By analyzing such factors in real-time, the OIRI scores and the OIRI assessments may be generated, which may provide key actionable insights that empower the entity to make informed decisions about cloud optimization strategies by avoiding unnecessary spend and reducing energy consumption of the computing resources.

Implementations of the present disclosure provide several benefits including:

Dynamic risk assessment: the proposed methodology may continuously monitor the cloud environment, adapt to changes and generate the OIRI scores and the OIRI assessments for each of the thousands of the computing resources optimization recommendations monthly. Such a dynamic approach may ensure that risk assessments remain relevant and up to date in the face of evolving challenges.

Granular risk metrics/fields for each of the computing resources optimization recommendations: The proposed methodology may offer granular insights into each of the computing resources optimization recommendations considering the multiple fields (e.g., more than 10 fields) associated with the computing resources optimization recommendations. Such a granularity may enable the entity to prioritize implementation efforts based on the OIRI scores and the OIRI assessments.

Integration with cloud platforms: the proposed methodology may seamlessly receive the computing resources optimization recommendations from leading cloud platforms (e.g., recommendation providers), while allowing the entity to leverage existing infrastructure and security controls. Such an integration may operate with tailored cost optimization services.

Scalability and Performance: the proposed methodology may be capable of handling large-scale computing resources optimization recommendations spanning multiple regions and recommendation providers. Further, the proposed methodology may deliver accurate risk assessment/evaluation without compromising on accuracy.

Implementations of the present disclosure may further provide a comprehensive risk indicator and assessment framework, which may empower organizations to unlock the full potential of cloud computing while mitigating the inherent risks and saving the cost/spend by approving the efficient recommendations.

Figure 17A:
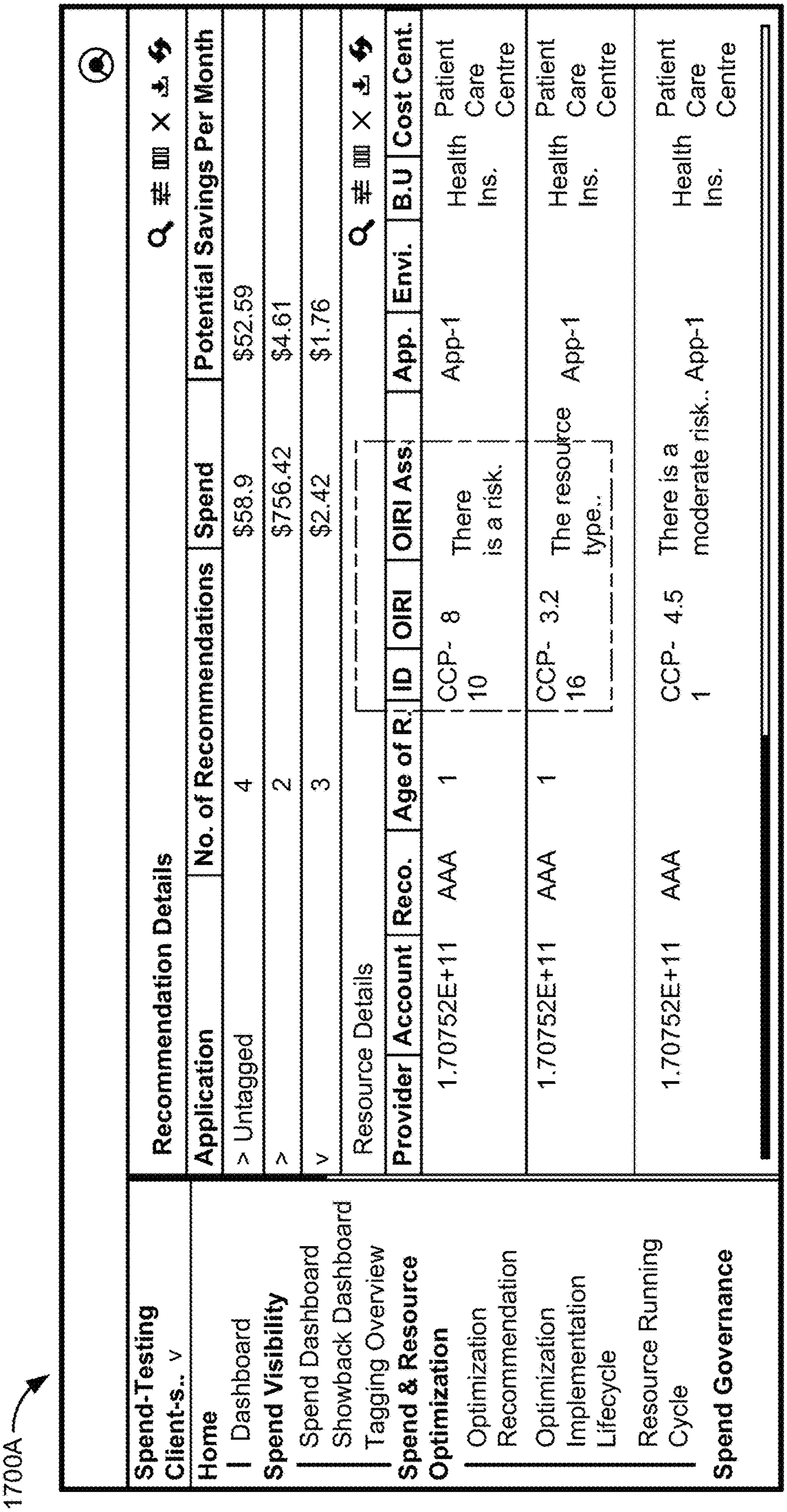
FIGS. 17A and 17B depict exemplary illustrations of the OIRI scores and the OIRI assessments generated for the computing resources optimization recommendations, in accordance with implementations of the present disclosure.
Figure 17B:
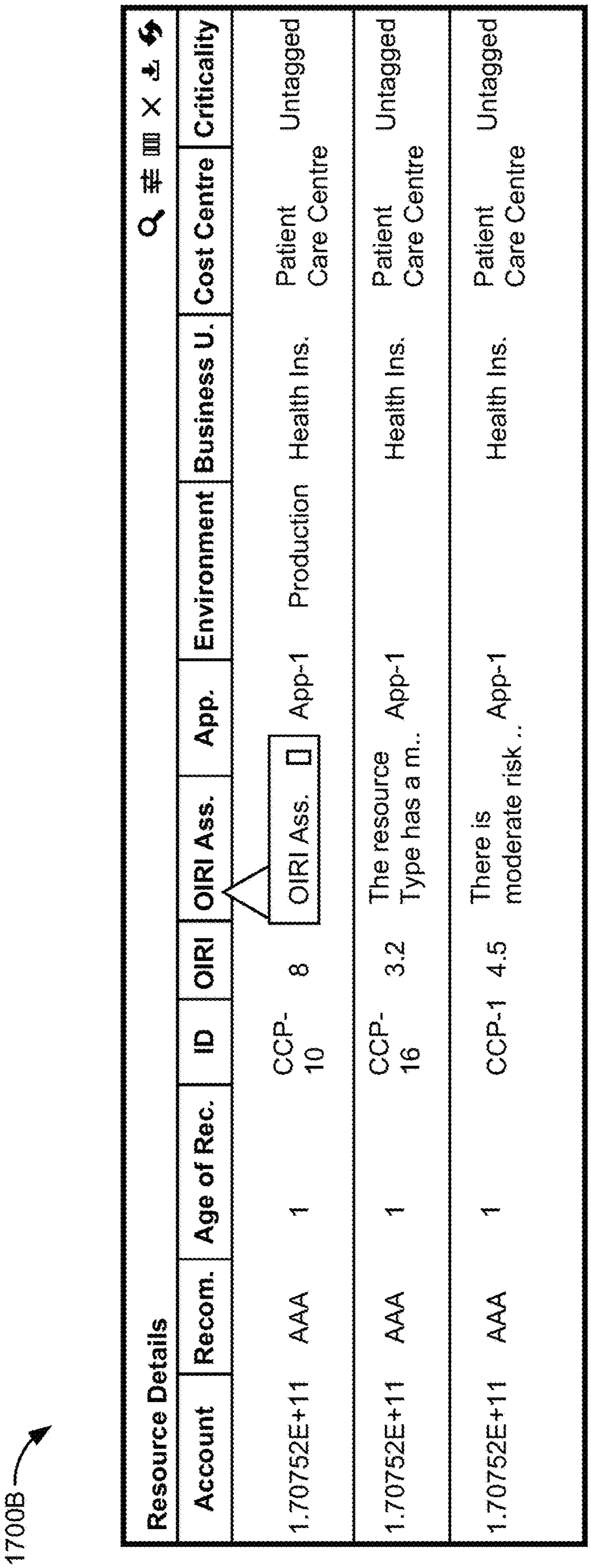

FIGS. 17A and 17B depict exemplary illustrations 1700A and 1700B of the OIRI scores and the OIRI assessments generated for the computing resources optimization recommendations, in accordance with implementations of the present disclosure.

The risk evaluation system 106 receives a request from the user of the client device 104 for evaluation of the computing resources optimization recommendations associated with the IDs CCP-10, CCP-11, and CCP-1. In such a scenario, the risk evaluation system 106 displays the OIRI scores and the OIRI assessments for the requested IDs along with the set of fields of the associated computing resources optimization recommendations. For example, the OIRI scores of 8, 3.2, and 4.5 may be generated for the requested IDs CCP-10, CCP-11, and CCP-1. The OIRI scores of less than 5 may be best suitable for implementation. Therefore, the user may approve the computing resources optimization recommendations associated with the IDs CCP-11 and CCP-1 for implementation. Alternatively, or additionally, the risk evaluation system 106 may automatically approve the implementation of the computing resources optimization recommendations associated with the IDs CCP-11 and CCP-1.

FIG. 17C depicts an example OIRI assessment 1700C, in accordance with implementations of the present disclosure. As depicted in FIG. 17C, the OIRI assessment may detail the impact, or the risk associated with the implementation of the respective computing resources optimization recommendations.

Figure 17D:
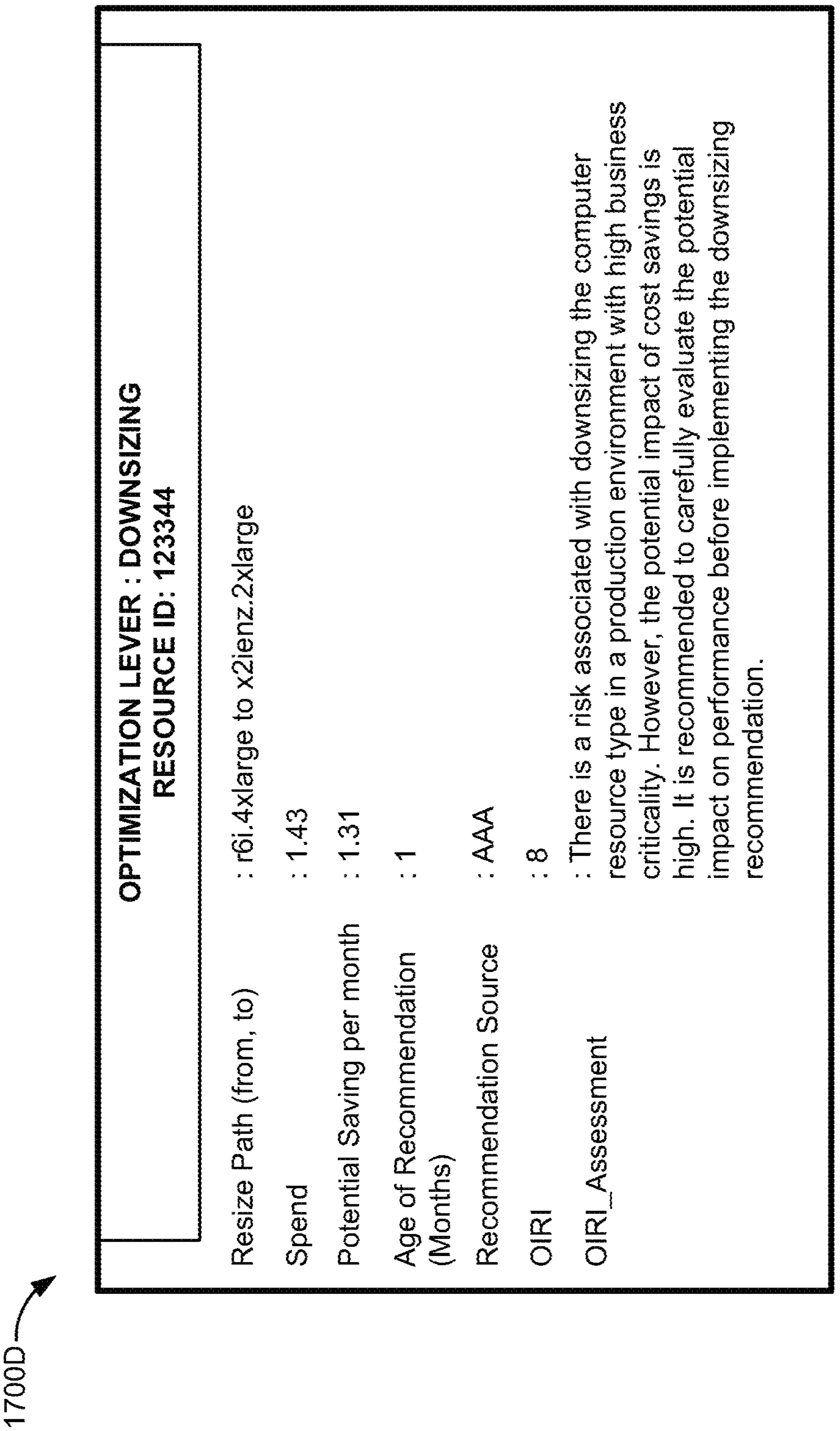
FIG. 17D depicts an example illustration of providing details of each of the computing resources optimization recommendations along with the OIRI scores and the OIRI assessments, in accordance with implementations of the present disclosure.

FIG. 17D depicts an example illustration 1700D of providing details of each of the computing resources optimization recommendations along with the OIRI scores and the OIRI assessments, in accordance with implementations of the present disclosure. For example, a computing resources optimization recommendation for downsizing a computing resource and details of such a recommendation is depicted in FIG. 17D. The details of the computing resources optimization recommendation may indicate an optimization lever, a resource ID, a resize path, a cost that needs to be spend for utilization of the computing resources in accordance with the computing resources optimization recommendation, an annual/potential savings per month, a time period of recommendation, a recommendation source, the OIRI score, and the OIRI assessment.

Figure 18:
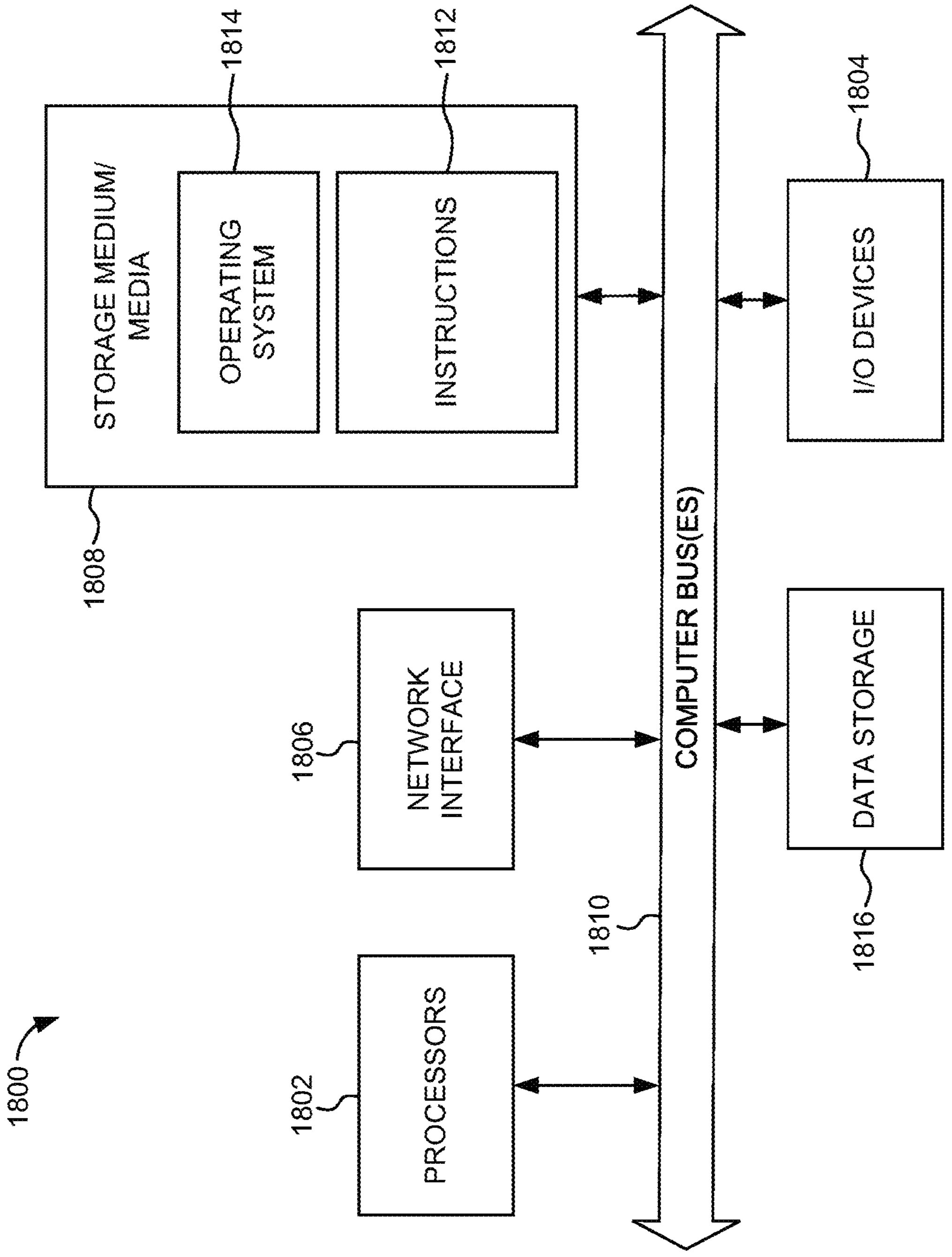
FIG. 18 depicts a computer system that may be used to implement an example method for evaluating the risks associated with implementation of the computing resources optimization recommendations, in accordance with implementations of the present disclosure.

FIG. 18 illustrates a computer system 1800 that may be used to implement the computer-implemented method 1600 and the associated risk evaluation system 106. More particularly, computing machines such as desktops, laptops, smartphones, tablets, and wearables which may be used to evaluate the risks associated with implementation of the computing resources optimization recommendations. The computer system 1800 may include additional components not shown and that some of the process components described may be removed and/or modified. In another example, a computer system 1800 may be deployed on external-cloud platforms such as cloud, internal corporate cloud computing clusters, organizational computing resources, and/or the like.

The computer system 1800 includes processor(s) 1802, such as a central processing unit, ASIC or another type of processing circuit, input/output devices 1804, such as a display, mouse keyboard, etc., a network interface 1806, such as a Local Area Network (LAN), a wireless 802.11x LAN, a 3G or 4G mobile WAN or a WiMax WAN, and a computer-readable medium 1808. Each of these components may be operatively coupled to a bus 1810. The computer-readable medium 1808 may be any suitable medium that participates in providing instructions to the processor(s) 1802 for execution. For example, the computer-readable medium 1808 may be non-transitory or non-volatile medium, such as a magnetic disk or solid-state non-volatile memory or volatile medium such as RAM. The instructions or modules stored on the computer-readable medium 1808 may include machine-readable instructions 1812 executed by the processor(s) 1802 that cause the processor(s) 1802 to perform the methods and functions of the risk evaluation system 106.

The computing system 1800 may be implemented as software stored on a non-transitory processor-readable medium and executed by the processor(s) 1802. For example, the computer-readable medium 1808 may store an operating system 1814, such as MAC OS, MS WINDOWS, UNIX, or LINUX, and code, for the computing system 1800. The operating system 1814 may be multi-user, multiprocessing, multitasking, multithreading, real-time, and the like. For example, during runtime, the operating system 1814 is running and the code for the computing system 1800 is executed by the processor(s) 1802.

The computer system 1800 may include a data storage 1816, which may include non-volatile data storage. The data storage 1816 stores any data used or generated by the computer system 1800.

The network interface 1806 connects the computer system 1800 to internal systems for example, via a LAN. Also, the network interface 1806 may connect the computer system 1800 to the Internet. For example, the computer system 1800 may connect to web browsers and other external applications and systems via the network interface 1806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 1802 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for evaluating risks associated with implementation of a plurality of computing resources optimization recommendations, the computer-implemented method comprising:

receiving, by one or more processors of at least one computing device, the plurality of computing resources optimization recommendations that are generated during a predetermined time duration;

generating, by the one or more processors, a parquet file according to a predetermined format, the predetermined format including a set of fields representing information of the plurality of computing resources optimization recommendations;

processing, by the one or more processors, the parquet file to obtain values corresponding to a subset of the set of fields for a computing resources optimization recommendation of the plurality of computing resources optimization recommendations;

providing, by the one or more processors, the values corresponding to the subset of the set of fields for the computing resources optimization recommendation as an input context to generate a prompt;

generating, by a configuration module of a model configurator executed by the one or more processors, deployment configurations by customizing a Generative Artificial Intelligence (Gen AI) model to be deployed to an endpoint;

generating, by an authenticator module of the model configurator, authentication credentials for accessing the Gen AI model via secure authentication mechanisms;

reviewing, by a reviewer module of the model configurator, the deployment configurations;

deploying, by the reviewer module, the Gen AI model to the end point using the deployment configurations upon successful review by the reviewer module;

integrating, by the reviewer module, a risk management application with the Gen AI model using the endpoint and the authentication credentials;

generating, by the one or more processors using the Gen AI model, an optimization implementation risk indicator (OIRI) score and an OIRI assessment of the computing resources optimization recommendation based upon the prompt; and causing, by the one or more processors, display of the OIRI score and the OIRI assessment along with the computing resources optimization recommendation in a graphical user interface of a client device of a user.

2. The computer-implemented method of claim 1, further comprising including one or more hyperparameters in the prompt for the Gen AI model.

3. The computer-implemented method of claim 2, wherein the one or more hyperparameters includes a seed parameter and/or a temperature parameter.

4. The computer-implemented method of claim 1, further comprising generating, by the one or more processors, the OIRI score based on a score value respective to each field of the subset of the set of fields and a weight corresponding to each field of the subset of the set of fields.

5. The computer-implemented method of claim 1, wherein the subset of the set of fields corresponds with non-confidential and/or non-sensitive information.

6. The computer-implemented method of claim 1, wherein a value of the OIRI score is 1 or 10 or greater than 1, or less than 10.

7. The computer-implemented method of claim 1, wherein the subset of the set of fields includes a provider, a resource type, a recommendation type, a recommendation description, a recommended action, a criticality of an optimization recommendation, an environment associated with the optimization recommendation, a potential monthly and/or annual savings value, and/or a current monthly cost.

8. A system for evaluating risks associated with implementation of a plurality of computing resources optimization recommendations, the system comprising:

at least one memory storing instructions; and at least one processor communicatively coupled with the at least one memory and configured to execute the instructions to perform operations comprising:

receiving the plurality of computing resources optimization recommendations that are generated during a predetermined time duration;

generating a parquet file according to a predetermined format, the predetermined format including a set of fields representing information of the plurality of computing resources optimization recommendations;

processing the parquet file to obtain values corresponding to a subset of the set of fields for a computing resources optimization recommendation of the plurality of computing resources optimization recommendations;

providing the values corresponding to the subset of the set of fields for the computing resources optimization recommendation as an input context to generate a prompt;

generating, by a configuration module of a model configurator, deployment configurations by customizing a Generative Artificial Intelligence (Gen AI) model to be deployed to an endpoint;

generating, by an authenticator module of the model configurator, authentication credentials for accessing the Gen AI model via secure authentication mechanisms;

reviewing, by a reviewer module of the model configurator, the deployment configurations;

deploying, by the reviewer module, the Gen AI module to the end point using the deployment configurations upon successful review by the reviewer module;

integrating, by the reviewer module, a risk management application with the Gen AI model using the endpoint and the authentication credentials;

generating, using the Gen AI model, an optimization implementation risk indicator (OIRI) score and an OIRI assessment of the computing resources optimization recommendation based upon the prompt; and causing display of the OIRI score and the OIRI assessment along with the computing resources optimization recommendation in a graphical user interface of a client device of a user.

9. The system of claim 8, wherein the operations further comprise including one or more hyperparameters in the prompt for the Gen AI model.

10. The system of claim 9, wherein the one or more hyperparameters includes a seed parameter and/or a temperature parameter.

11. The system of claim 8, wherein the operations further comprise generating the OIRI score based on a score value respective to each field of the subset of the set of fields and a weight corresponding to each field of the subset of the set of fields.

12. The system of claim 8, wherein the subset of the set of fields corresponds with non-confidential and/or non-sensitive information.

13. The system of claim 8, wherein a value of the OIRI score is 1 or 10 or greater than 1, or less than 10.

14. The system of claim 8, wherein the subset of the set of fields includes a provider, a resource type, a recommendation type, a recommendation description, a recommended action, a criticality of an optimization recommendation, an environment associated with the optimization recommendation, a potential monthly and/or annual savings value, and/or a current monthly cost.

15. A non-transitory computer-readable media (CRM) having instructions stored thereon, which when executed by at least one processor of at least one computing device, cause evaluating risks associated with implementation of a plurality of computing resources optimization recommendations by performing operations comprising:

receiving the plurality of computing resources optimization recommendations that are generated during a predetermined time duration;

generating a parquet file according to a predetermined format, the predetermined format including a set of fields representing information of the plurality of computing resources optimization recommendations;

processing the parquet file to obtain values corresponding to a subset of the set of fields for a computing resources optimization recommendation of the plurality of computing resources optimization recommendations;

providing the values corresponding to the subset of the set of fields for the computing resources optimization recommendation as an input context to generate a prompt;

generating, by a configuration module of a model configurator, deployment configurations by customizing a Generative Artificial Intelligence (Gen AI) model to be deployed to an endpoint;

generating, by an authenticator module of the model configurator, authentication credentials for accessing the Gen AI model via secure authentication mechanisms;

reviewing, by a reviewer module of the model configurator, the deployment configurations;

deploying, by the reviewer module, the Gen AI module to the end point using the deployment configurations upon successful review by the reviewer module;

integrating, by the reviewer module, a risk management application with the deployed Gen AI model using the endpoint and the authentication credentials;

generating, using the Gen AI model, an optimization implementation risk indicator (OIRI) score and an OIRI assessment of the computing resources optimization recommendation based upon the prompt; and causing, by the one or more processors, display of the OIRI score and the OIRI assessment along with the computing resources optimization recommendation in a graphical user interface of a client device of a user.

16. The non-transitory CRM of claim 15, wherein the operations further comprise including one or more hyperparameters in the prompt for the Gen AI model, wherein the one or more hyperparameters includes a seed parameter and/or a temperature parameter.

17. The non-transitory CRM of claim 15, wherein the operations further comprise generating the OIRI score based on a score value respective to each field of the subset of the set of fields and a weight corresponding to each field of the subset of the set of fields.

18. The non-transitory CRM of claim 15, wherein the subset of the set of fields corresponds with non-confidential and/or non-sensitive information.

19. The non-transitory CRM of claim 15, wherein a value of the OIRI score is 1 or 10 or greater than 1, or less than 10.

20. The non-transitory CRM of claim 15, wherein the subset of the set of fields includes a provider, a resource type, a recommendation type, a recommendation description, a recommended action, a criticality of an optimization recommendation, an environment associated with the optimization recommendation, a potential monthly and/or annual savings value, and/or a current monthly cost.

* * * * *